United States Patent
Rajagopal et al.

(10) Patent No.: US 6,665,335 B1
(45) Date of Patent: Dec. 16, 2003

(54) SYSTEM AND METHOD FOR ESTIMATING A SHIFT BETWEEN TWO SIGNALS WHERE ONE SIGNAL IS KNOWN IN ADVANCE

(75) Inventors: Ram Rajagopal, Austin, TX (US); Lothar Wenzel, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/553,200

(22) Filed: Apr. 20, 2000

Related U.S. Application Data

(63) Continuation-in-part of application No. 09/435,723, filed on Nov. 8, 1999, now abandoned.

(51) Int. Cl.[7] .............................................. H04B 17/00
(52) U.S. Cl. ...................................................... 375/224
(58) Field of Search ................................. 375/224, 371, 375/226; 702/189; 382/225

(56) References Cited

U.S. PATENT DOCUMENTS

| | | | |
|---|---|---|---|
| 5,111,511 A | * | 5/1992 | Ishii et al. .................. 382/107 |
| 6,429,895 B1 | * | 8/2002 | Onuki ..................... 348/208.99 |
| 6,535,640 B1 | * | 3/2003 | Rajagopal et al. .......... 382/225 |

OTHER PUBLICATIONS

Mita et al., *Handbook for Digital Signal Processing*, 1993, pp. 514–517.

* cited by examiner

Primary Examiner—Don N. Vo
(74) *Attorney, Agent, or Firm*—Meyertons Hood Kivlin Kowert & Goetzel, P.C.; Jeffrey C. Hood

(57) ABSTRACT

A system and method for estimating the shift between two signals. The shift estimation system method comprises: (a) receiving a first signal, where the first signal may be represented as a vector g having N components; (b) projecting the vector g to a space with dimension K less than N to obtain a projection vector X having K components; (c) computing measures of distance between the projection vector X and each vector in a set of stored vectors; (d) determining a stored vector p in the set of stored vectors with a minimum distance to the projection vector X. The stored vectors are generated from a template signal f, also represented as a vector with N components, by projecting shifted versions of the template signal f to the space of dimension K. The shifted versions of the template signal f may be referred to as shifted template vectors, or simply, shift vectors. The shift estimation method may provide a shift value corresponding to the shifted template vector which generates the stored vector p as an estimate for the shift between the received signal and the template signal f. The shift value defines the amount by which the template signal f must be shifted to obtain the shifted template vector.

54 Claims, 19 Drawing Sheets

$$F = \begin{bmatrix} f(0) & f(1) & \cdots & f(N-1) & f(N-2) & \cdots & f(N-2) & f(N-1) \\ f(1) & f(2) & \cdots & f(0) & f(N-1) & \cdots & f(N-3) & f(0) \\ \vdots & \vdots & \ddots & \vdots & \vdots & \ddots & \vdots & \vdots \\ f(N-2) & f(N-1) & \cdots & f(N-4) & f(N-3) & \cdots & f(N-4) & f(N-3) \\ f(N-1) & f(0) & \cdots & f(N-3) & f(N-2) & \cdots & f(N-3) & f(N-2) \end{bmatrix}$$

FIG. 3

$$\begin{bmatrix} f(0) & f(1) & \cdots & f(N-1) \\ f(1) & f(2) & \cdots & f(0) \\ \vdots & \vdots & \ddots & \vdots \\ f(N-1) & f(0) & \cdots & f(N-2) \end{bmatrix} \begin{bmatrix} c_0(0) & c_1(0) & \cdots & c_{K-1}(0) \\ c_0(1) & c_1(1) & \cdots & c_{K-1}(1) \\ \vdots & \vdots & \ddots & \vdots \\ c_0(N-1) & c_1(N-1) & \cdots & c_{K-1}(N-1) \end{bmatrix} = \begin{bmatrix} a_0(0) & a_0(1) & \cdots & a_0(K-1) \\ a_1(0) & a_1(1) & \cdots & a_1(K-1) \\ \vdots & \vdots & \ddots & \vdots \\ a_{N-1}(0) & a_{N-1}(1) & \cdots & a_{N-1}(K-1) \end{bmatrix}$$

FIG. 4

$$[g(0) \quad g(1) \quad \ldots \quad g(N-1)] \cdot \begin{bmatrix} c_0(0) & c_1(0) & \ldots & c_{K-1}(0) \\ c_0(1) & c_1(1) & \ldots & c_{K-1}(1) \\ \vdots & \vdots & \ddots & \vdots \\ c_0(N-1) & c_1(N-1) & \ldots & c_{K-1}(N-1) \end{bmatrix} = [X(0) \quad X(1) \quad \ldots \quad X(K-1)]$$

$$C = \begin{bmatrix} \cos\left(\dfrac{-2\pi m_0 \cdot 0}{N}\right) & \sin\left(\dfrac{-2\pi m_0 \cdot 0}{N}\right) \\ \cos\left(\dfrac{-2\pi m_0 \cdot 1}{N}\right) & \sin\left(\dfrac{-2\pi m_0 \cdot 1}{N}\right) \\ \cos\left(\dfrac{-2\pi m_0 \cdot 2}{N}\right) & \sin\left(\dfrac{-2\pi m_0 \cdot 2}{N}\right) \\ \vdots & \vdots \\ \cos\left(\dfrac{-2\pi m_0 \cdot (N-1)}{N}\right) & \sin\left(\dfrac{-2\pi m_0 \cdot (N-1)}{N}\right) \end{bmatrix}$$

FIG. 14B

SYSTEM AND METHOD FOR ESTIMATING A SHIFT BETWEEN TWO SIGNALS WHERE ONE SIGNAL IS KNOWN IN ADVANCE

CONTINUATION DATA

This application is a continuation-in-part of U.S. patent application Ser. No. 09/435,723 entitled "SYSTEM AND METHOD FOR ESTIMATING A SHIFT BETWEEN TWO SIGNALS WHERE ONE SIGNAL IS KNOWN IN ADVANCE", filed on Nov. 8, 1999, now abandoned, invented by Ram Rajagopal and Lothar Wenzel, and assigned to National Instruments Corporation.

FIELD OF THE INVENTION

The present invention relates to the field of signal processing, and in particular, to an improved system and method for computing the amount of shift between two signals.

DESCRIPTION OF THE RELATED ART

A great variety of systems may be characterized by the property that they generate a series of signals which are shifted and noise-perturbed versions of some known template signal. For example, radar systems operate by repeatedly transmitting a known pulse template and receiving the pulse reflections generated by objects (such as aircraft) which intercept the field of view of the radar beam. The pulse reflections are delayed versions of the transmitted pulse and are corrupted by various forms of noise such as multipath noise. The time-delay between the transmitted pulse and the pulse reflection is a measure of an object's distance.

The problem of estimating the shift (e.g. time-delay) between two signals x(n) and y(n) is one of the most fundamental problems in signal processing. Perhaps the most popular method for solving the shift estimation problem involves the use of cross-correlation. The cross-correlation method involves computing a cross-correlation $$R_{xy}(\tau) = \sum_{n} x(n+\tau)y(n), \quad (A1)$$

for shift values τ spanning a range of expected values. The shift-value $\tau_{max}$ for which the cross-correlation $R_{xy}(\tau)$ is maximized is taken to be an estimate for the shift between signals x(n) and y(n).

The problem of shift estimation is just as relevant for periodic signals, or more generally, for signals defined on the integers modulo N, where N is a positive integer. (Physically realizable discrete-time signals are finite in duration and may be naturally interpreted as being defined on the integers modulo N.) Given two signals f and g defined on the integers modulo N, where signal g is known to be a shifted version of signal f the circular cross-correlation $$R_{fg}(d) = \sum_{n=0}^{N-1} f([n+d]_N)g([n]_N) \quad (A2)$$

may be evaluated for shift value d equal to 0, 1, 2, ..., N−1. The shift-value $d_{max}$ for which the circular cross-correlation $R_{fg}(d)$ is maximized may be taken as an estimate for the circular shift between signals f and g. Thus, the circular cross-correlation method requires $N^2$ multiplies and N(N−1) additions in order to generate a shift estimate between two functions. More efficient methods do exist. All of them are complicated and cannot reduce the numerical complexity significantly.

It can be shown that the circular cross-correlation of signals f and g may be expressed as a circular convolution, i.e.

$$R_{fg}(d) = \sum_{k=0}^{N-1} f([d-k]_N) u([k]_N), \quad (A3)$$

where signal u denotes the time-reversal of signal g, i.e.

$$u([k]_N) = g([-k]_N). \quad (A4)$$

Thus, the discrete Fourier transform $\hat{R}_{fg}$ of circular cross-correlation function $R_{fg}$ equals the product of the discrete Fourier transforms $\hat{f}$ and $\hat{u}$ of signals f and u respectively, i.e.

$$\hat{R}_{fg} = \hat{f} \cdot \hat{u}. \quad (A5)$$

Thus, the circular cross-correlation function $R_{fg}$ may be computed indirectly as suggested by the following expression:

$$R_{fg} = IDFT(\hat{f} \cdot \hat{g}), \quad (A6)$$

where IDFT denotes the inverse discrete Fourier transform operator. If Fast Fourier Transforms (FFTs) are used to compute the pair of forward DFTs and the inverse DFT, this method for computing the circular cross-correlation function $R_{fg}$ has computational complexity of order $\alpha N \log_2(N)$, where α is a fixed number. Thus, this indirect method for computing the circular cross-correlation function is significantly more efficient than the exhaustive cross-correlation method as represented by equation (A2). However, according to Mitra et al., it is only useful for N>256, due to complex number overhead and due to the factor α.

Given a signal h defined on the integers modulo N, the Discrete Fourier transform $\hat{h}$ of signal h may be defined as $$\hat{h}(k) = \sum_{n=0}^{N-1} h(n) \cdot \exp\left(\frac{-j2\pi nk}{N}\right), \quad (A7)$$

where index k varies from 0 to N−1. Let $f^d$ denote the signal obtained by shifting the elements of signal f by d positions, i.e. $f^d([n]_N) = f([n+d]_N)$. Using the DFT definition (A7), it can be shown that the discrete Fourier transform $\hat{f}^d$ of shifted signal $f^d$ is given by $$\hat{f}^d(k) = \hat{f}(k) \cdot \exp\left(\frac{jdk2\pi}{N}\right), \quad (A8)$$

where k varies from 0 to N−1, and where $\hat{f}$ denotes the discrete Fourier transform of signal f Expression (A8) implies that $$\mathrm{Arg}\left[\hat{f}^d(k)\right] - \mathrm{Arg}\left[\hat{f}(k)\right] = \frac{dk2\pi}{N} + 2\pi r, \quad (A9)$$

for some integer r, where Arg[z] denotes the principle angle of complex number z. Solving for shift parameter d gives the expression $$d = \frac{N}{2\pi k}\left\{\mathrm{Arg}\left[\hat{f}^d(k)\right] - \mathrm{Arg}\left[\hat{f}(k)\right]\right\} + \frac{Nr}{k}. \quad (A10)$$

Expression (A10) may be used as the basis for a shift estimation method. Let g be a signal whose shift relative to template signal f is unknown. Let ĝ denote the discrete Fourier transform of signal g. Substituting the transform ĝ for the transform $\hat{f}^d$ in expression (A10) gives $$d = \frac{N}{2\pi k}\left\{\mathrm{Arg}[\hat{g}(k)] - \mathrm{Arg}\left[\hat{f}(k)\right]\right\} + \frac{Nr}{k}. \quad (A11)$$

Since the integer value r is not known, there may be ambiguity in the value of shift parameter d. For example, the quantity $^{Nr}/_k$, and therefore, the right hand side of expression (A11), may attain k distinct values modulo N depending on the value of integer r. However, if k equals one, the shift estimation value d is determined unambiguously. Thus, another method for estimating the shift between signals f and g may be summarized by the formula $$d = \frac{N}{2\pi}\{\mathrm{Arg}[\hat{g}(1)] - \mathrm{Arg}[\hat{f}(1)]\}(\mathrm{mod}\ N). \quad (A11)$$

It is noted that this phase-difference method is much more efficient computationally than the exhaustive cross-correlation and FFT-based cross-correlation methods described above as shown in FIG. 1. The computational effort for the phase-difference method is order N since only one DFT coefficient of the signal g needs to be computed. However, the performance (estimation accuracy) of the phase-difference method degrades at much lower noise levels than the cross-correlation methods as shown in FIG. 2.

Furthermore, the phase-difference method and the cross-correlation methods provide no mechanism for improving estimation accuracy based on knowledge of the noise process which operates on the shifted template f to generate signal g.

Thus, there exists a substantial need for a system and method which could estimate the shift between two signals with a combination of computational efficiency and noise immunity. Furthermore, there exists a need for a shift estimation system and method which could take advantage of information about the underlying noise process to improve estimation accuracy.

There is an implied tradeoff between computational efficiency, and noise resistance as shown by FIG. 2. Thus, there exists a need for a method which could explicitly determine the tradeoff.

SUMMARY OF THE INVENTION

The present invention comprises a system and method for estimating the shift between two signals. The shift between the signals may be interpreted as time-delay, spatial shift, rotation angle, etc. For example, the present invention may be used to estimate the shift in a signal g relative to a template signal f. The shift estimation system method comprises: (a) receiving a first signal g, where the first signal g may be represented as a vector g having N components; (b) projecting the vector g to a space with dimension K less than N to obtain a projection vector X having K components; (c) computing measures of distance between the projection vector X and vectors in a set of stored vectors; (d) determining a stored vector p in the set of stored vectors with a minimum distance to the projection vector X based on the measures of distance. The stored vectors are generated from a template signal f, also represented as a vector with N components, by projecting shifted versions of the template signal f to the space of dimension K. The shifted versions of the template signal f may be referred to as shifted template vectors, or simply, shift vectors. The shift estimation method may provide a shift value based on the shifted template vector which generates the stored vector p, where the shift value is as an estimate for the shift between the received signal and the template signal f. The shift value defines the amount by which the template signal f must be shifted to obtain the shifted template vector.

In the preferred embodiment of the shift estimation method, the shifted versions of the template signal f are projected to the space of dimension K by matrix multiplication. In other words, each of the shifted templates are multiplied by an appropriately chosen matrix C. In addition, the projection of the vector g is achieved in the same way, i.e. by multiplying the vector g with the matrix C.

The matrix C may be computed or estimated in a variety of ways. In the preferred embodiment, the matrix C is computed by performing an iterative search in the set of matrices with N rows and K columns in order to maximize an objective function. A simulated annealing algorithm may be used to perform the iterative search.

In one embodiment, the objective function may be evaluated on a candidate matrix Y by (1) multiplying the set of shifted template vectors by the candidate matrix Y to generate a set of image vectors; (2) computing a minimal distance between the image vectors; (3) computing a noise object size associated with the candidate matrix Y; (4) and computing a ratio comprising the minimal distance and the noise object size.

In addition, the method of the present invention may advantageously provide increased estimation accuracy by computing the matrix C based on knowledge of the underlying noise process. For example, given a noise model g=U{f,d} which describes the random generation of signal g in terms of template function f and shift parameter value d, the present invention contemplates (i) multiplying the set of shifted template vectors by a candidate matrix Y to generate a set of image vectors; (ii) computing, for each of the image vectors, a distance to a nearest neighbor in the set of image vectors; (iii) estimating a noise radius (or noise object size) for the distribution of projection vector gY based on the noise model for each value of the shift parameter d; (iv) computing, for each of the image vectors, the ratio of the distance to the nearest neighbor and the corresponding noise radius, (v) determining the maximum of the ratios over the set of image vectors, (vi) iteratively performing (i) through (v) for a series of matrices Y to locate the matrix Y=C which minimizes the maximum of the ratios.

Alternatively, the matrix C may be computed as follows. First, compute the discrete Fourier transform of the template signal f. Second, identify a collection of K/2 distinct integers in the range from 1 to N−1 which maximize the sum of magnitudes of the Fourier transform evaluated on the collection of K/2 distinct integers subject to a spanning condition. Finally, for each integer m in the collection of K/2 distinct integers, assign the cosine and sine waveforms with frequency m to a corresponding pair of columns of matrix C. In one embodiment, the spanning condition is that the greatest common divisor of N and the collection of K/2 distinct integers is one. In another embodiment, the spanning condition is that at least one of the K/2 distinct integer is relatively prime to N.

Let $f^d$ denote the vector obtained by circularly shifting the entries of template signal f through d positions. Because template signal f has N components, there are exactly N distinct circularly-shifted versions of template signal f denoted $f^0, f^1, f^2, \ldots, f^{N-1}$. The set of stored vectors mentioned in (c) may be generated by projecting any subset S of the circularly-shifted versions $f^0, f^1, f^2, \ldots, f^{N-1}$ into the K-dimensional space. The subset S may comprise all of the circularly-shifted versions $f^0, f^1, f^2, \ldots, f^{N-1}$.

However, if it is known that the signals g are never generated with values of the shift parameter d in a particular range, the shifted versions $f^d$ corresponding to this particular range may be excluded from the subset S. The computational effort for the distance computations (or distance measurement computations), i.e. step (c) above, is proportional to the size of the subset S. Thus, any reduction in the size of subset S advantageously increases the computational efficiency of the shift estimation method of the present invention. Furthermore, it is observed that the average distance between the stored vectors increases as the number shifted versions $f^d$ in subset S decreases. This implies a higher probability of correct shift estimation. Thus, knowledge of the type or kind of shift, or the range of possible shifts, may be used to provide increased efficiency and estimation accuracy.

The shift estimation method may be implemented in software configured for execution on one or more processors. Alternatively, the shift estimation method, or any portion thereof, may be implemented by dedicated hardware such as a Field Programmable Gate Array (FPGA).

In the preferred embodiment, the shift estimation system operates on a series of signals which are shifted and perhaps noise-perturbed versions of the template signal f. Each of the signals may be presented as a vector g with N components. The shift estimation method estimates the shift of each of the signals with respect to the template signal f.

The present invention also contemplates a signal analyzer system which comprises a processor coupled to a memory. The processor is configured to execute a shift estimation routine stored in the memory. The shift estimation routine may be configured to implement the shift estimation method of the present invention.

BRIEF DESCRIPTION OF THE DRAWINGS

A better understanding of the present invention can be obtained when the following detailed description is considered in conjunction with the following drawings, in which:

FIG. 3 depicts the structure of the input matrix F according to the present invention;

FIG. 4 illustrates multiplication of the input matrix F with a specially chosen matrix C to generate a matrix A according to the present invention;

FIG. 14B illustrates the structure of the matrix C according to the alternate procedure of FIG. 14A for the special case of K=2;

Figure 1:
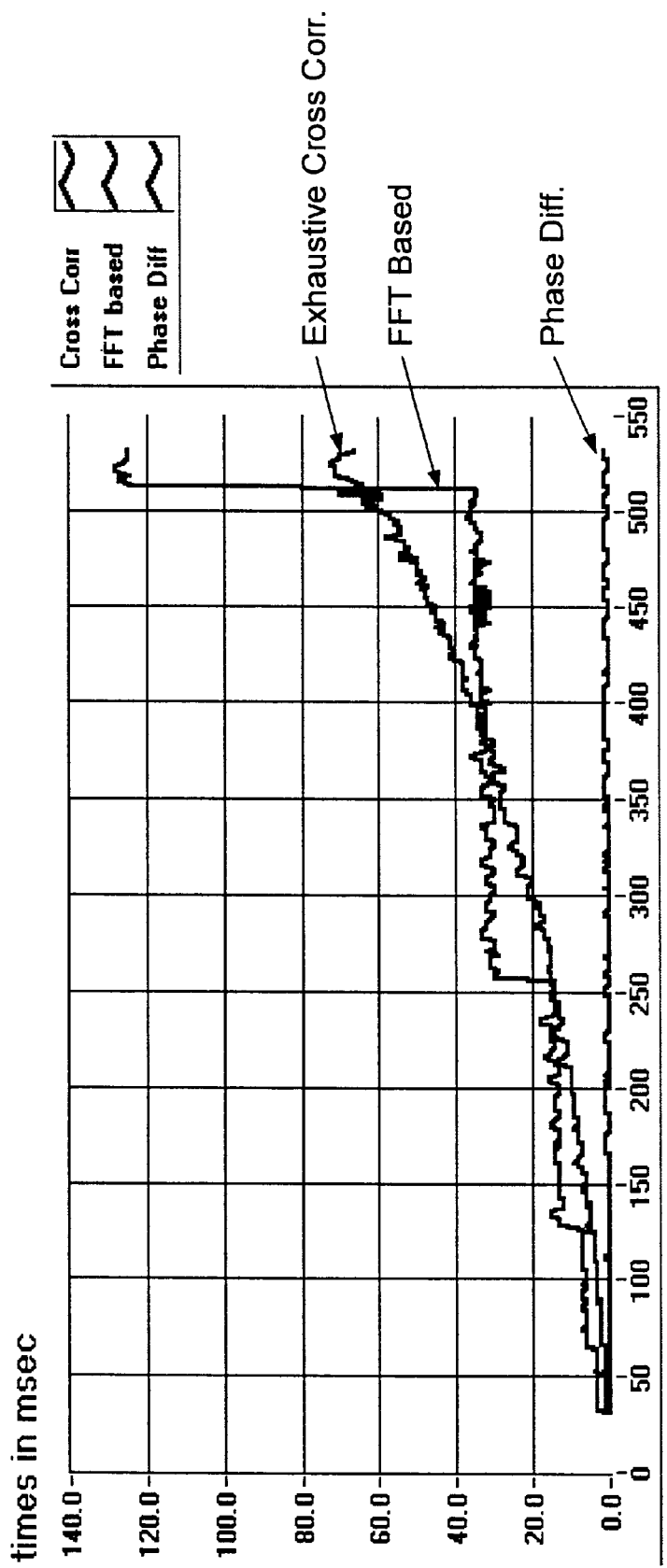
FIG. 1 is a graph of computational effort versus input array size N for the exhaustive cross-correlation method, the FFT-based cross-correlation method, and the phase difference method.
Figure 2:
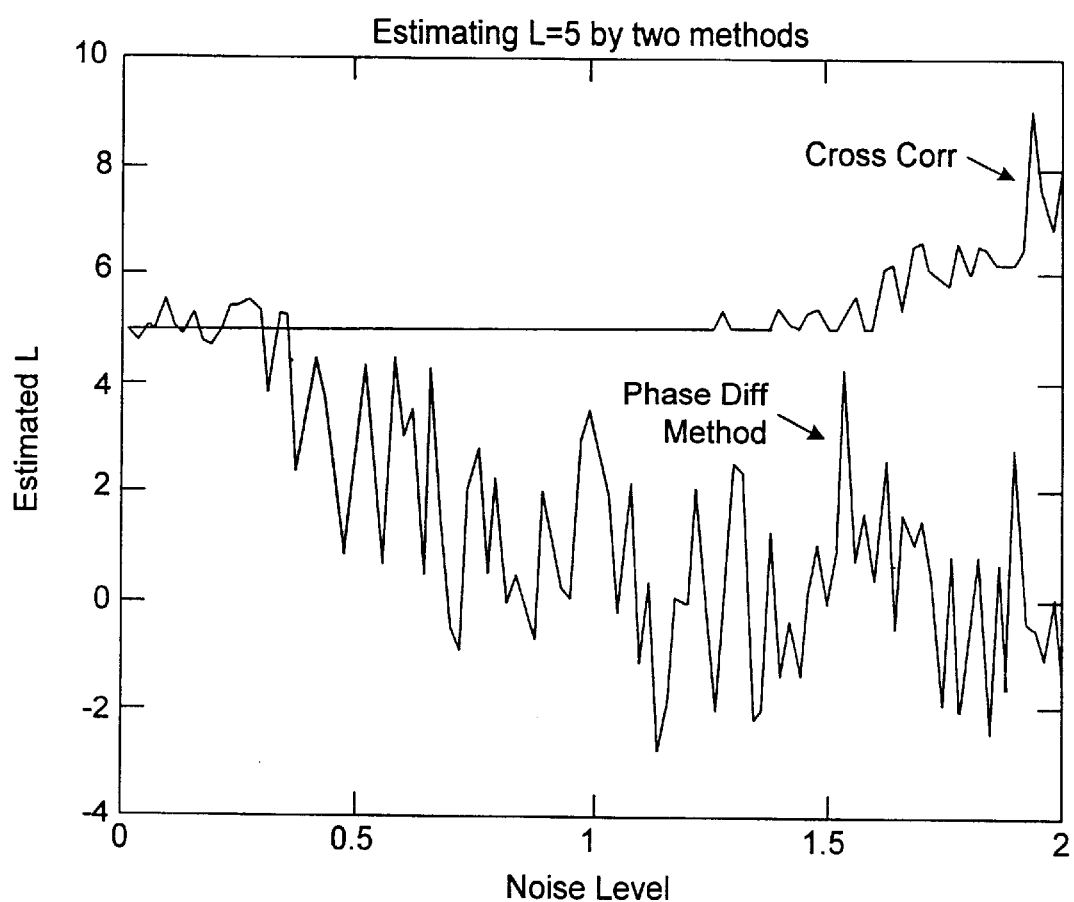
FIG. 2 is a graph of the estimated shift between two signals as a function of noise level for the cross-correlation method and the phase-difference method.

While the invention is susceptible to various modifications and alternative forms, specific embodiments are shown by way of example in the drawings and will herein be described in detail. It should be understood however, that drawings and detailed descriptions thereto are not intended to limit the invention to the particular forms disclosed. But on the contrary the invention is to cover all modifications, equivalents and alternatives following within the spirit and scope of the present invention as defined by the appended claims.

DETAILED DESCRIPTION OF THE PREFERRED EMBODIMENT

Suppose f is a signal defined on the integers modulo N. Furthermore, suppose that g is a shifted and possibly noise-perturbed version of signal f. The relationship between signals f and g may therefore be expressed as $$g([n]_N) = U\{f([n+d]_N)\}, \qquad (1)$$

where U represents a noise operator, d is a shift parameter, and $[k]_N$ denotes the equivalence class of k modulo N. If the noise is additive, expression (1) reduces to $$g([n]_N)=f([n+d]_N)+e(n), \quad (2)$$

where e(n) represents a noise process. Alternatively, if the noise is multiplicative, expression (1) reduces to the form $$g([n]_N)=(1+\epsilon(n)) \cdot f([n+d]_N), \quad (3)$$

where $\epsilon(n)$ is another noise process.

Given signals f and g, the present invention comprises a system and method for estimating the shift parameter d. Furthermore, given a collection of signals g with unknown and arbitrary values of the shift parameter d, and all based on the same signal f as a template, the present invention comprises a system and method for estimating the shift parameter d for each of the signals g. The shift estimation method of the present invention may be described mathematically as follows.

1. Given a signal or function f defined on the integers modulo N, construct an N×N matrix F from the functions according to the relation $$F_n^m = f([n+m]_N), \quad (4)$$

where m and n are indices which independently run from 0 to N−1, where $F_n^m$ denotes the coefficient which occupies row m and column n of matrix F. Matrix F is illustrated in FIG. 3. Relation (4) implies that row zero of matrix F, denoted $f^0$, comprises the unshifted values of functions i.e.

$$f^0=[f(0)f(1) \ldots f(N-2) f(N-1)]. \quad (5)$$

The modulus operator $[*]_N$ has been suppressed in the last expression and in FIG. 3 for the sake of simplicity. The remaining rows of matrix F comprise circularly-shifted versions of the first row. For example, the $m^{th}$ row of matrix F, denoted $f^m$, may be obtained by circularly shifting the first row $f^0$ exactly m positions to the left. Matrix F will be referred to herein as the input matrix.

2. Choose a dimension K usually in the range 1 to N. Computational effort and estimation accuracy increase as K increases.

3. Select an N×K matrix C so that the rows of the product matrix FC are advantageously distributed in K-dimensional space. The properties that define an advantageous distribution of rows will be discussed more fully later. FIG. 4 illustrates the multiplication of matrices F and C to generate a resultant matrix A. The coefficients of matrix C are denoted $c_j(i)$, where i is the row index, and j is the column index. The row index i runs from 0 to N−1, and the column index j runs from 0 to K−1. Since F is an N×N matrix and C in an N×K matrix, A is an N×K matrix. Thus, the rows of matrix A may be interpreted as vectors in a K-dimensional space. Let $a_0, a_1, \ldots, a_{N-1}$ denote the rows of matrix A. The coefficients of matrix A are denoted $a_j(k)$, wherein j is the row index, and k is the column index. The row index j runs from 0 to N−1, and the column index k runs from 0 to K−1. The present invention provides a method for selecting a matrix C which optimizes the distribution of vectors $a_0, a_1, \ldots, a_{N-1}$ given matrix F and knowledge of the noise process U. This matrix selection method will be discussed in detail later.

Figures 5, 6:
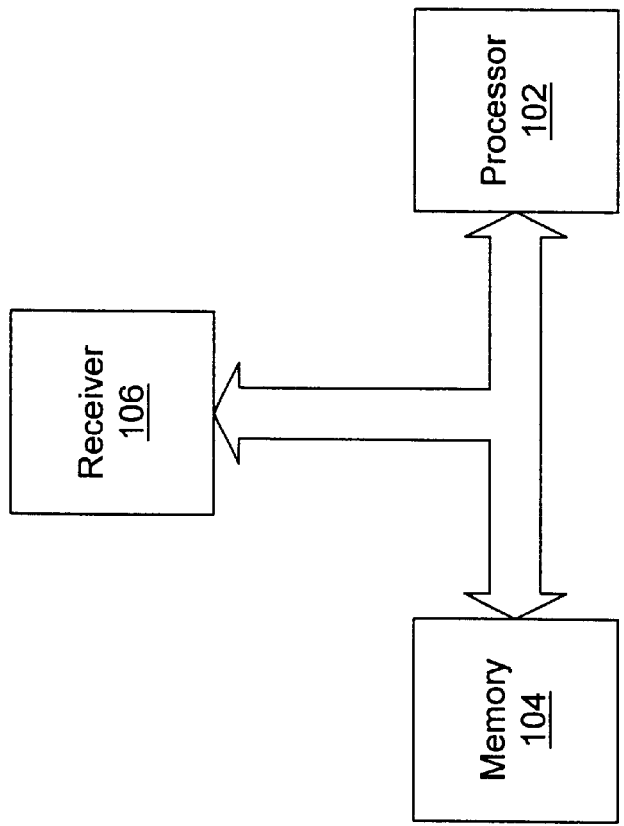
FIG. 5 illustrate multiplication of a received vector g with the matrix C to generate a projection vector X according to the present invention.
FIG. 6 illustrates one embodiment of a shift estimation system according to the present invention.

4. Given a signal or function g (which is a shifted and possibly noise-perturbed version of template functions in the form of an N-dimensional row vector, i.e.

$$g=[g(0)g(1) \ldots g(N-2)g(N-1)],$$

multiply the vector g by matrix C to generate a projection vector X, i.e. X=gC. FIG. 5 illustrates the multiplication of row vector g by matrix C to obtain the projection vector X. Because matrix C has size N×K, the projection vector X has K components. Thus, projection vector X may be naturally compared to the rows of matrix A.

5. Compute measures of the distance between the projection vector X and the rows $a_0, a_1, \ldots, a_{N-1}$ of matrix A. The present invention contemplates several methods for efficiently computing these distance measures. (See the sections below entitled "Identifying the Minimizing Image Vector", "Memory Based Distance Estimation", and "Randomized Estimation Algorithm".) For example, in one embodiment, the dot product of the projection vector X and each of the rows of matrix A may be computed. In another embodiment, the $L^1$-norm may be used as the measure of distance. In fact, any norm may be used as a basis for distance measurement.

6. Select the index D of the row $a_D$ with minimum distance from the projection vector X as an estimate for the shift parameter d based on the measures of distance computed in step 5 above.

As mentioned above, steps 4, 5 and 6 may be performed repeatedly (e.g. iteratively) for a whole ensemble of different signals g (functions g) based on a common template signal f (function f). The matrix C needs to be recomputed only if the underlying template signal f changes or if the noise operator U changes its statistical properties.

FIG. 6 presents one possible embodiment for the shift estimation system of the present invention. The shift estimation system of FIG. 6 may comprise a processor 102, a memory medium 104 and a receiver 106. Processor 102 may be realized by any of a variety of processor technologies. For example, processor 102 may be a general purpose processor, a vector processor, a parallel processor, a digital signal processor, etc. It is noted that programmable or reconfigurable logic, e.g., a Field Programmable Gate Array (FPGA), may be used instead of or in addition to the processor 102.

Receiver 106 represents any of a variety of receiving devices or sensors. For example, receiver 106 may be a radio receiver, a video receiver, an audio/speech receiver, a seismic receiver, a modem, a sensing device, a radar receiver, etc.

Receiver 106 may receive a series of signals g, and may provide vectorized representations of these signals to processor 102. Thus, processor 102 may receive a stream of vectors g which represent or comprise shifted (and noise-perturbed) versions of a template signal f. Alternatively, receiver 106 may transfer the stream of vectors g directly to memory medium 104. A vector g may comprise a finite sequence of numerical values.

The series of signals may be presented to receiver 106 in analog form. In this case, receiver 106 may include analog-to-digital conversion circuitry (not shown) for sampling the series of signals. Receiver 106 may store a sequence of the A/D samples in response to the initiation of a signal in the series, e.g., in response to the received power exceeding a predefined threshold, or a received voltage level exceeding a voltage threshold, etc. The sequence of stored samples comprise a vector g representing the signal.

The system of FIG. 6 may also include one or more user input devices such as a keyboard, mouse, trackball, etc., and one or more output devices such as a display.

The shift estimation system of FIG. 6 preferably includes a memory medium 104 on which computer programs according to the present invention are stored. The term "memory medium" is intended to include various types of memory or storage including: an installation medium, e.g., a CD-ROM, or floppy disks; a computer system memory such as DRAM, SRAM, EDO RAM, Rambus RAM, etc.; a non-volatile memory such as a magnetic media, e.g., a hard drive, or optical storage; or any combination thereof. The memory medium 104 may comprise other types of memory as well. In addition, the memory medium 104 may be located in a first computer in which the programs are executed, or may be located in a second different computer which connects to the first computer over a network. In the latter instance, the second computer provides the program instructions to the first computer for execution. Also, the shift estimation system of FIG. 6 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium 104 preferably stores a software program for performing shift estimation between two signals according to the present invention. The software program may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A CPU, such as processor 102, executing code and data from the memory medium 104 comprises a means for executing the software program according to the methods or flowcharts described below.

Various embodiments further include receiving, storing, or transmitting instructions and/or data implemented in accordance with the following description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

Figure 7A:
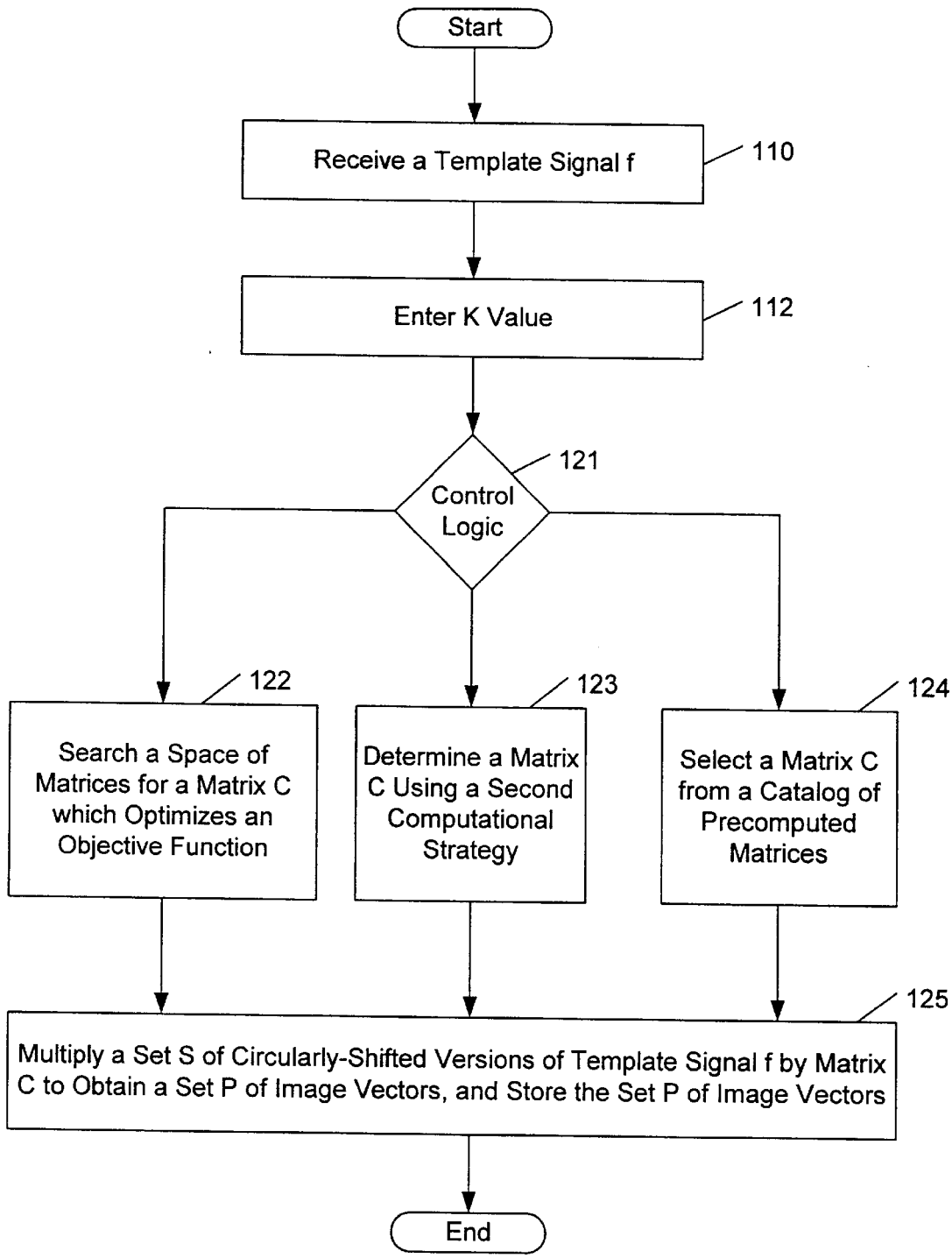
FIGS. 7A & 7B illustrate one embodiment of the shift estimation method according to the present invention.
Figure 7B:
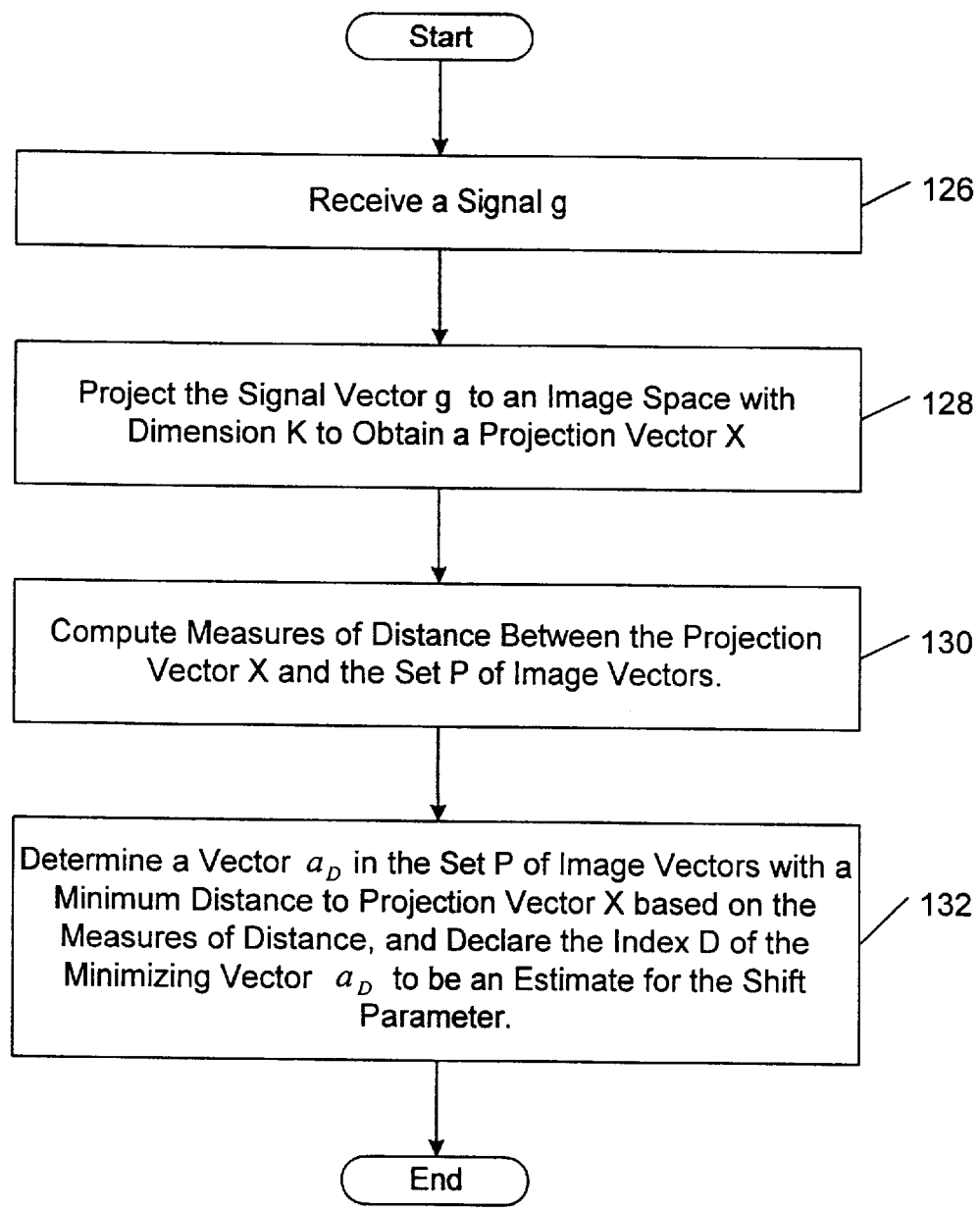

FIGS. 7A and 7B are flowcharts illustrating one embodiment of the shift estimation method according to the present invention, and may be interpreted in conjunction with the system of FIG. 6. The flowcharts in FIG. 7A & 7B may be implemented in one or more software routines which execute on processor 102.

In step 110, processor 102 receives a template signal f. For example, processor 102 may receive a pointer to a vector $$f=[f(0)f(1) \ldots f(N-2)f(N-1)]$$

stored in memory 104. Hereinafter, the terms template signal f and vector f may be used interchangeably.

In step 112, processor 102 prompts a user to enter a positive integer K. The integer K defines the dimension of an image space into which various vectors will be projected. Processor 102 may automate the choice of integer K based on user specified information such as desired estimation accuracy and/or noise modeling data.

In step 121, denoted "control logic", processor 102 may determine which of steps 122, 123 or 124 to perform. Processor 102 may prompt the user for an input indicating which of these steps to execute.

In step 122, processor 102 may search the space of N×K matrices to determine a matrix C which optimizes an objective function. The definition of the objective function will be presented later. The matrix C may be stored in memory 104 for later use.

In step 123, processor 102 may compute an N×K matrix C by using a second computational strategy to be described later. In the preferred embodiment, the second computational strategy may be used only when K is even.

In step 124, processor 102 allows a user to select an N×K matrix C from a catalog of precomputed matrices.

In step 125, processor 102 may use the matrix C to project a set S of circularly shifted versions of the template signal f into K-dimensional space to obtain a set P of image vectors. Let $f^m$ denote the vector obtained by circularly shifting the entries of vector f to the left m positions. (It is noted that the choice of shifting the template vector f to the left as opposed to the right is arbitrary). For example, if template vector f=[1 5 3 4 2], then circularly-shifted vector $f^2$=[3 4 2 1 5]. Because vector f has N components, there are exactly N distinct circularly-shifted versions of vector f denoted $f^0, f^1, f^2, \ldots, f^{N-1}$. The set S may comprise some or all of the shifted versions $f^0, f^1, f^2, \ldots, f^{N-1}$. Let V denote the set of shift parameter values m which generate the set S, i.e. $S=\{f^m: m \in V\}$.

If it is known that the vectors g are never generated with values of the shift parameter m in a particular range, the shifted versions of vector f corresponding to this particular range may be excluded from the set S, i.e. the values of the shift parameter m in this particular range may be excluded from the generating set V. Thus, knowledge of the type or kind of shift, or the range of possible shifts, may be used to provide increased efficiency or accuracy.

For each circularly-shifted vector $f^i$ in set S, processor 102 may multiply the circularly-shifted vector $f^i$ by matrix C to generate a corresponding image vector $a_i=f^iC$. The set P of image vectors may thus be summarized by the expression P=SC. Processor 102 may store the set P of image vectors in memory 104.

Steps 110 through 125 may be implemented by a software initialization routine. The initialization routine may be called by a parent program. The parent program may pass to the initialization routine a pointer to template vector f as an input variable. Furthermore, the initialization routine may return (as output variables) a pointer to the matrix C and a pointer to the set P of image vectors in memory 104.

Steps 110–125 may be performed in a pre-computation phase prior to receiving any of the shifted signals g. Thus steps 126–132 of FIG. 7B need only be performed for each received signal g.

FIG. 7B illustrates computational steps for estimating the shift parameter d of a signal g generated from the template signal f. These computational steps are preferably performed after the initialization steps described in FIG. 7A. The steps in FIG. 7B may be performed for each received signal g.

In step 126, processor 102 receives a signal g. For example, processor 102 may receive a pointer to a vector $$g=[g(0)g(1) \ldots g(N-2)g(N-1)]$$

stored in memory 104. Hereinafter, the terms signal g and vector g will be used interchangeably.

In step 128, processor 102 may project the vector g to K-dimensional space to obtain a projection vector X having K components. In the preferred embodiment, processor 102 projects the vector g by multiplying the vector g with the matrix C, i.e. projection vector X=gC. This vector-matrix multiplication is illustrated in FIG. 5.

In step 130, processor 102 may compute measures of distance between projection vector X and the image vectors $a_i$ in the set P (computed in step 125 above). In one embodiment, processor 102 computes dot products between vector gC and vector $f^iC$ in the K-dimensional image space for each i∈V. The Euclidean norm, $L^1$ norm, or any other norm, may be used to compute the measures of distance. The $L^1$ norm is especially efficient since it may be computed without performing a multiplication or root extraction. (The $L^1$ norm of a vector is defined as the sum of the absolute values of its components. Thus, the $L^1$ distance between two vectors is defined as the sum of the absolute values of the differences of corresponding coordinates of the two vectors.)

In step 132, processor 102 determines an image vector $a_D$ in set P which achieves a minimum distance to projection vector X based on the measures of distance computed in step 130, and the index D of this minimizing image vector $a_D$ is declared to be an estimate for the shift parameter d. If dot products are computed as the measure of distance, the minimizing image vector $a_D$ may be identified as the image vector with a maximum dot product value. Maximizing the dot product is equivalent to minimizing distance. Processor 102 may perform further computations and/or provide an output to the user in response to identifying the shift parameter estimate D.

See the sections below entitled "Identifying the Minimizing Image Vector", "Memory Based Distance Estimation", and "Randomized Estimation Algorithm" for alternative methods for determining the vector $a_D$ in set P which is closest to the projection vector X. These alternative methods may replace steps 130 and 132 of FIG. 7B.

It is noted that steps 126–132 may be implemented as a shift estimation routine which may be called by a parent program. This shift estimation routine may be invoked upon receipt of a signal g. The parent program may pass to the shift estimation routine a pointer to the vector g, a pointer to the matrix C, and a pointer to the set P of image vectors stored in memory 104. The shift estimation routine may return the shift parameter estimate D to the parent program. The shift estimate D may then be used in subsequent processing or may be displayed to the user.

For example, in a radar application, the shift parameter estimate D may represent a round-trip propagation time for a radar pulse transmitted from a radar base station and reflected back to the base station by a physical object. The propagation time may be multiplied by the speed of light and divided by two to obtain a distance to the object. This distance information along with angular information may be presented to the user on a display screen.

The shift estimation method of FIG. 7B may advantageously estimate the shift between two signals with increased efficiency relative to prior art shift estimation algorithms such as the FFT-based cross correlation method. The FFT-based cross correlation method generates a shift estimate using order N·log N multiplies. In contrast, the shift estimation method of the present invention generates a shift estimate using KN multiples (when the $L^1$ norm is used to evaluate vector distances) where K may take any value greater than or equal to one. Typically, K is less than or equal to N. Thus, for sufficiently small values of K, the shift estimation method of the present invention may provide significant computational savings over the FFT-based cross-correlation method. Usually, small values of K are advantageous, especially for N approximately equal to 100.

In one embodiment of the present invention, receiver 106 receives a stream of signals g, and in response to the received signals, is configured to provide a stream of vectors g to processor 102 (perhaps through memory 104). Steps 126–132 of FIG. 7B may be performed for each vector g in the received stream. The initialization steps of FIG. 7A may be performed off-line before initiation of the stream of vectors g.

In a second embodiment, a collection of vectors g are accumulated in memory 104, and processor 102 operates on the collection in a batch fashion. Processor 102 performs steps 126–132 of FIG. 7B for each of the vectors g in the collection.

Figure 8:
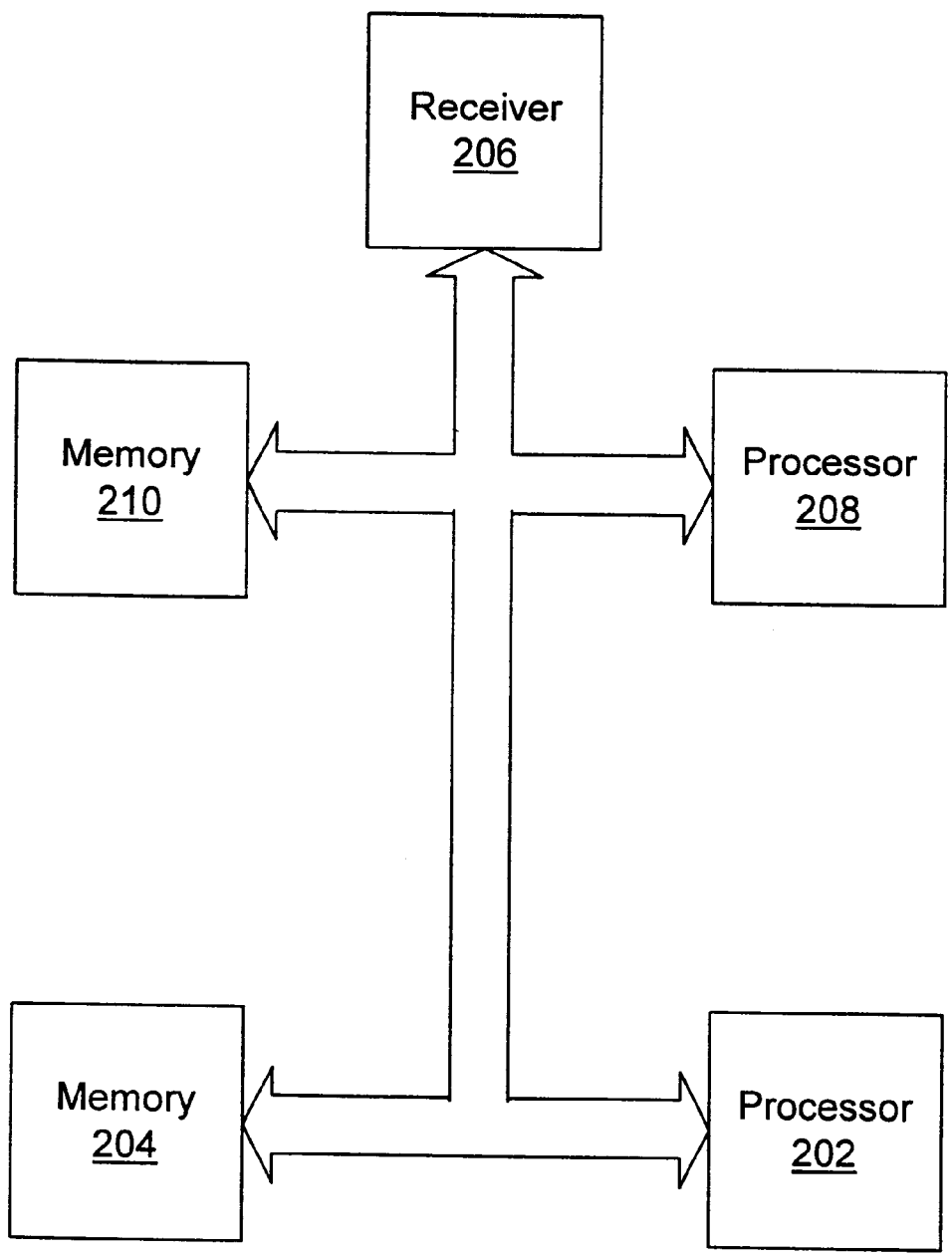
FIG. 8 illustrates a second embodiment of the shift estimation system according to the present invention.

FIG. 8 illustrates a second embodiment of the shift estimation system according to the present invention. The embodiment of FIG. 8 comprises a first processor 202, a first memory 204, a second processor 208, a second memory 210 and a receiver 206. The first processor 202 may be realized by any of a variety of processor technologies. For example, the first processor 202 may be a general-purpose processor. The first processor 202 may be configured to execute code and operate on data stored in first memory 204. The second processor 208 may be realized by any of a variety of processor technologies. For example, the second processor 208 may be a high-speed digital signal processor (DSP). The first processor 202 may perform initialization steps 110 through 125 (of FIG. 7A) while running under the control of an initialization routine stored in first memory 204. After computing the matrix C and the set P of image vectors, the first processor 202 may transfer the matrix C and the set P of image vectors to second memory 210. The second processor 208 may perform the computational steps 126 through 132 of FIG. 7B while running under the control of an on-line estimation routine stored in second memory 210. The on-line estimation routine may receive a stream of vectors g from receiver 206, and execute steps 126 through 132 for each vector g in the received stream using the matrix C and the set P of image vectors previously stored in memory 210.

Figure 9:
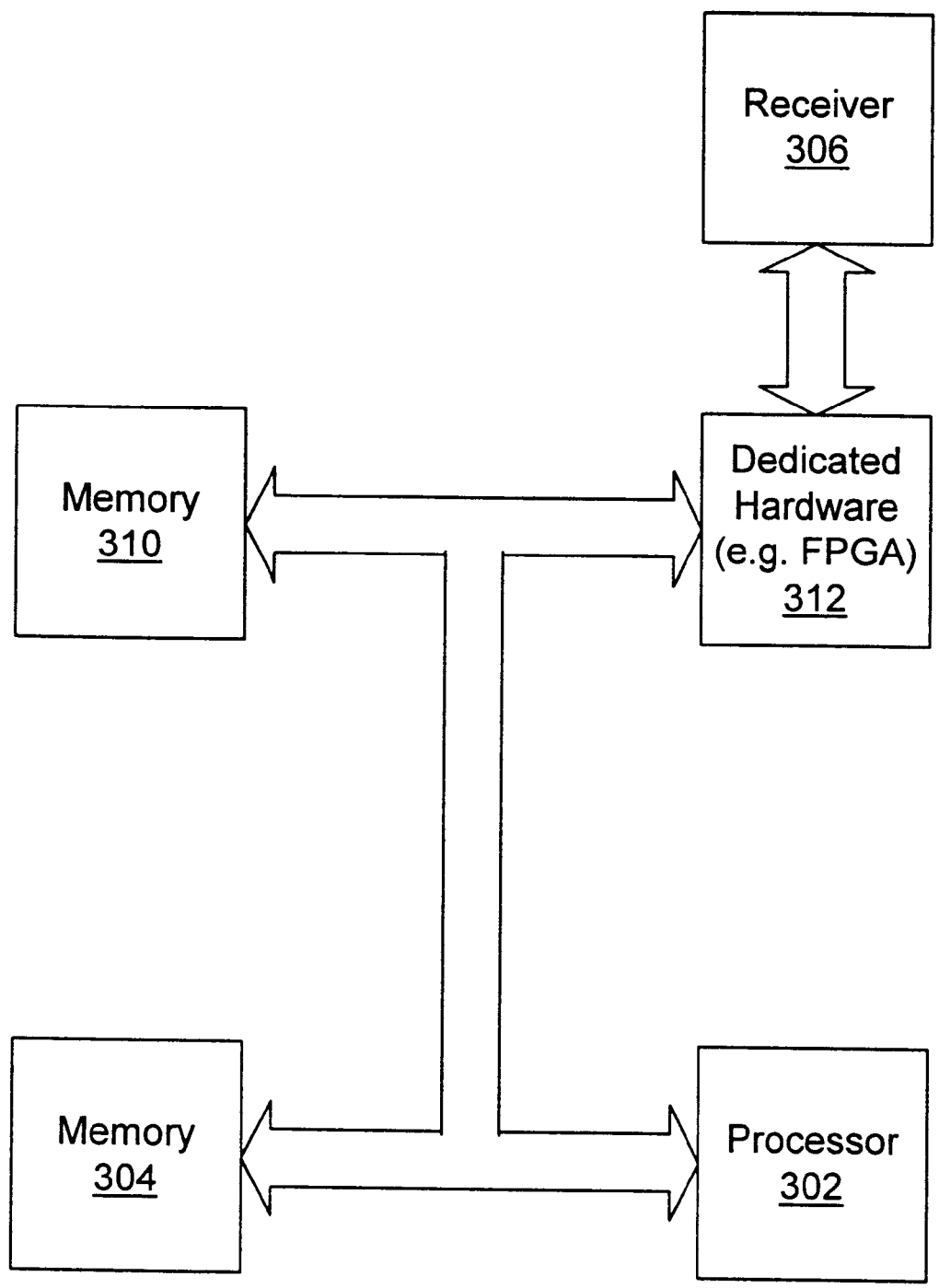
FIG. 9 illustrates a third embodiment of the shift estimation system according to the present invention.

FIG. 9 illustrates a third embodiment of the shift estimation system according to the present invention. The embodiment of FIG. 9 comprises a processor 302, a first memory 304, dedicated hardware 312 (such as a field programmable gate array), second memory 310 and receiver 306. Processor 302 may be realized by any of a variety of processor technologies. For example, processor 302 may be a general purpose processor, a digital signal processor, a vector processor, etc. Processor 302 may be configured to execute code and operate on data stored in first memory 304. Processor 302 may perform the initialization steps 110 through 125 (of FIG. 7A) while running under the control of an initialization routine stored in first memory 304. Processor 302 may transfer the matrix C and the set P of image vectors to second memory 310. Dedicated hardware 312 may receive a stream of vectors g from receiver 306, and perform the computational operations associated with steps 126 through 132 of FIG. 7B for each vector g in the received stream. Dedicated hardware 312 may access values of the matrix C and image vectors of the set P from second memory 310. In one embodiment, dedicated hardware 312 may be a field programmable gate array (FPGA) which has been programmed with a binary file. The binary file imparts to the field programmable gate array a desired hardware architecture. The hardware architecture may be highly optimized to minimize the execution time of steps 126 through 132. For example, the distance measurement computations between projection vector X and the image vectors $a_i$ of set P may be parallelized.

Figure 10:
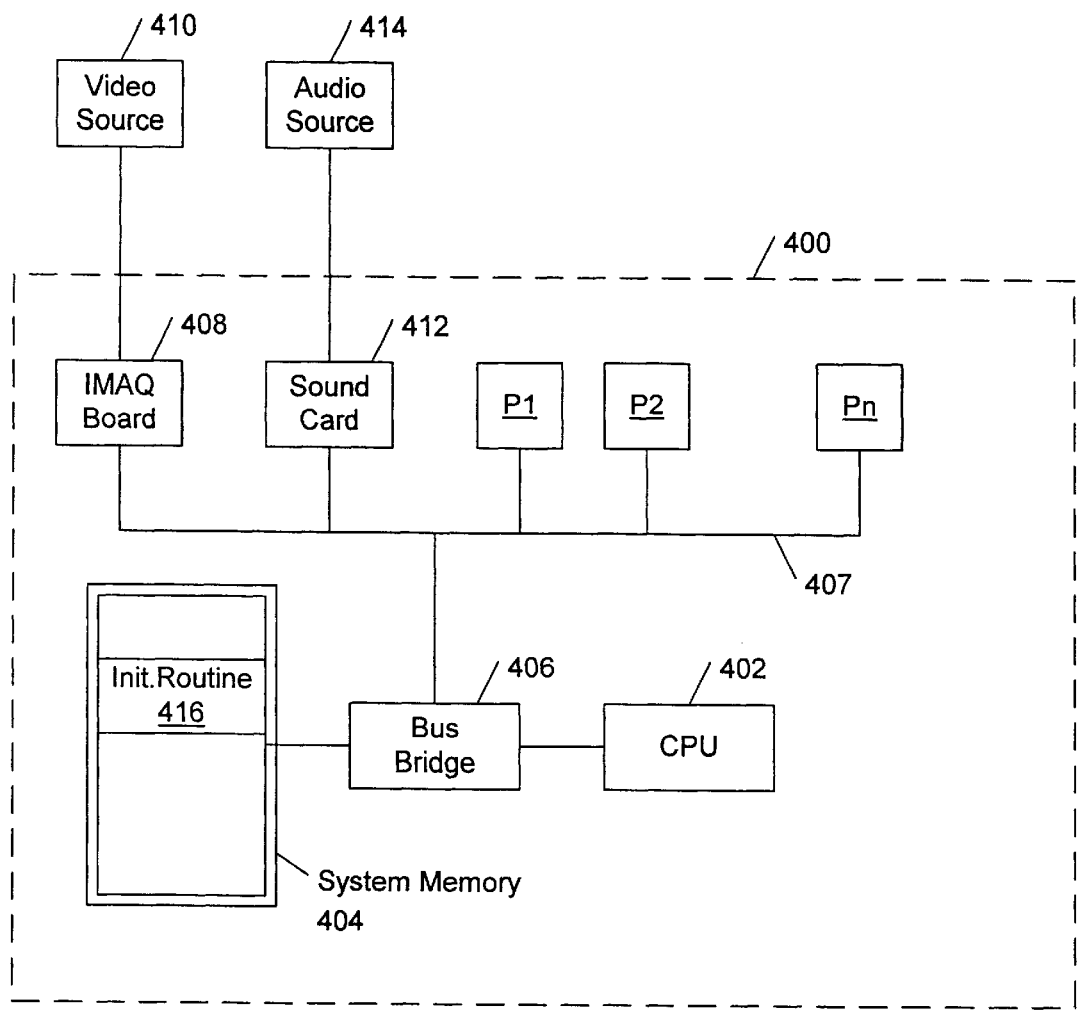
FIG. 10 illustrates a computer system for performing shift estimation according to the present invention.

FIG. 10 illustrates a computer system 400 for performing shift estimation according to one embodiment of the present invention. The computer system 400 may include a central processing unit (CPU) 402 and a system memory 404. CPU 402 may be realized by any of a variety of processor technologies. For example, CPU 402 may be a general purpose microprocessor. System memory 404 may store processing routines for execution on CPU 402. Computer system 400 may also include a bus bridge 406 and an array of peripheral devices P1 through Pn coupled to a peripheral bus 407. Bus bridge 406 may mediate data transfers between any two of CPU 402, system memory 404 and peripheral bus 407. Peripheral devices P1 through Pn are representative of devices such as modems, network interface cards, signal acquisition boards, serial interface cards, receivers, etc. Computer system 400 may also include an image acquisition board 408 and/or a sound card 412. The image acquisition board 408 may be configured to acquire image data from a video source 410 (e.g. a video camera, a television receiver, etc.). Image acquisition board 408 may perform DMA or bus-mastering transfers of image data to system memory 404. Sound card 412 may be configured to acquire audio or speech signal data from audio source 414 (e.g. a microphone, a radio receiver, a telephony device, etc.). The sound card 412 may also perform DMA or bus-mastering transfers of audio signal data to system memory 404.

CPU 402 may perform the initialization steps 110–125 of FIG. 7A while running under the control of an initialization routine 416 stored in system memory 404. CPU 402 may store the matrix C and the set P of image vectors in system memory 404. CPU 402 may also perform the computational operations associated with steps 126 through 132 of FIG. 7B. CPU 402 may operate on a stream of vectors g received from one of peripherals P1–Pn, image acquisition board 408 or sound card 412, and may perform steps 126 through 132 for each vector g in the received stream.

Alternatively, CPU 402 may download the matrix C and the set P of image vectors to an on-board memory (not shown) in one of peripherals P1–Pn, image acquisition board 408 or sound card 412. The peripheral (i.e. the one targeted by the downloaded data) may have an embedded CPU or dedicated hardware (such as an FPGA) for performing the operations associated with steps 126 through 132 of FIG. 7B. The peripheral may receive a digital or analog input signal from an external source such as video source 410 or audio source 414. The peripheral may extract from the input signal a series of vectors g which are shifted and noise-perturbed versions of the template signal f. The peripheral may perform steps 126 through 132 of FIG. 7B for each vector g in the series.

Let $f^n$ denote the cyclic-shift of the template vector f by n positions to the left. Recall that the set S (introduced in connection with step 125 of FIG. 7A) comprises some or all of the cyclic-shift vectors $f^0, f^1, f^2 \ldots, f_{N-1}$, and is generated by the index set V, i.e., $S=\{f^n: n \in V\}$. The method of the present invention comprises projecting a received vector g and the set S of cyclic-shift vectors into a space of dimension K less than or equal to N. The projection comprises multiplying the received vector and each cyclic-shift vector $f^n$ in set S by a specially chosen matrix C of size N×K. The distance (or measure of distance) between the projection vector gC and image vector $f^nC$ for each n∈V is computed, and the index D of the image vector $f^DC$ which achieves a minimum distance (or extremal distance measure) from gC is selected as an estimate for the shift parameter d between vector g and template signal f. The probability of error in estimation of the shift parameter may be minimized by choosing matrix C so that the image vectors $f^nC$ are as "far apart" as possible in a sense to be explained shortly.

The present invention operates on the assumption that the received vector g is a shifted and perhaps noise-perturbed version of the template vector f, i.e. $g=U(f^d)$ for some shift value d, where U is a noise operator. In equation (2), i.e. $g=f^d+e$, the noise U is modeled as an additive perturbation e(n) to the shifted template $f^d$. In equation (3), i.e. $g(n)=(1+\epsilon(n))\cdot f^d(n)$, the noise process U is modeled as a multiplicative perturbation $\epsilon(n)$. The noise processes e(n) and $\epsilon(n)$ may be determined from theoretical arguments or from physical measurements.

Given a fixed value of the shift parameter d, the noise process U imparts a random distribution to vector g, and thus, to vector gC. The vector gC is distributed in the neighborhood of the K-dimensional vector $f^dC$. The probability distribution of vector gC given that the shift parameter is fixed with value d will be referred to herein as the noise object $G_d$ for shift value d.

Figure 11:
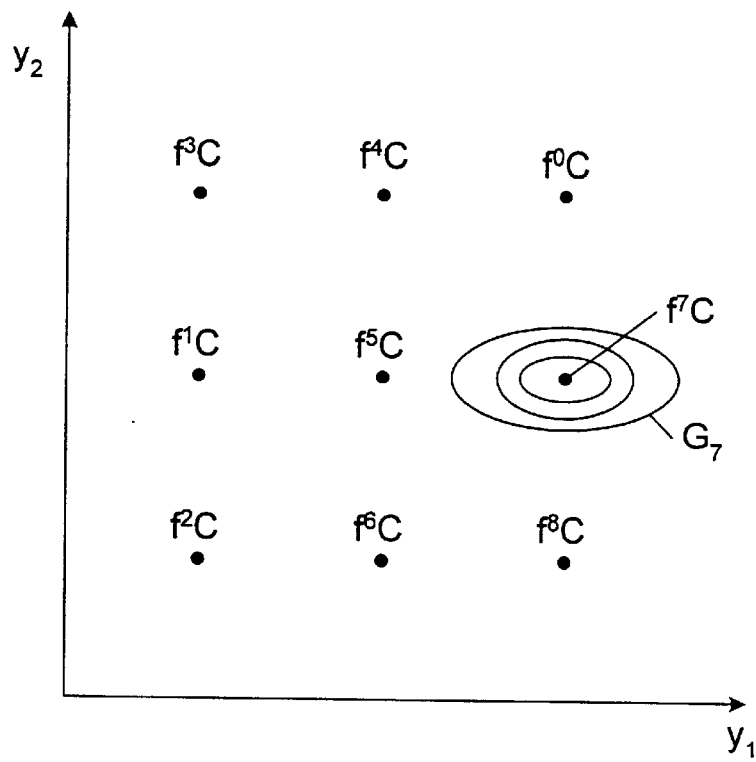
FIG. 11 presents a set of image vectors displayed in a two-dimensional image space and level curves for a noise object associated with a particular shift value, i.e. d=7.

FIG. 11 illustrates a set P of image vectors arranged in a two-dimensional image space (i.e. K=2) for a template vector f with size N=9. The underlying set S includes all nine of the shifted template vectors $f^0, f^1, f^2, \ldots, f^8$. These nine shift vectors project onto nine image vectors $f^dC$ in the two-dimensional image space. Each of the image vectors $f^dC$ has a noise object $G_d$ associated with it. However, for the sake of simplicity only the noise object $G_7$ for the shift value d=7 is depicted. The shape of noise object $G_7$ is indicated by its level curves. A Gaussian noise process e(n) or $\epsilon(n)$ implies that the noise objects are Gaussian, and that their level curves are elliptical. It is noted that the nine image vectors are shown as lying on a rectangular grid for ease of illustration, and do not necessarily correspond to a realizable template vector f and matrix C.

Figure 12:
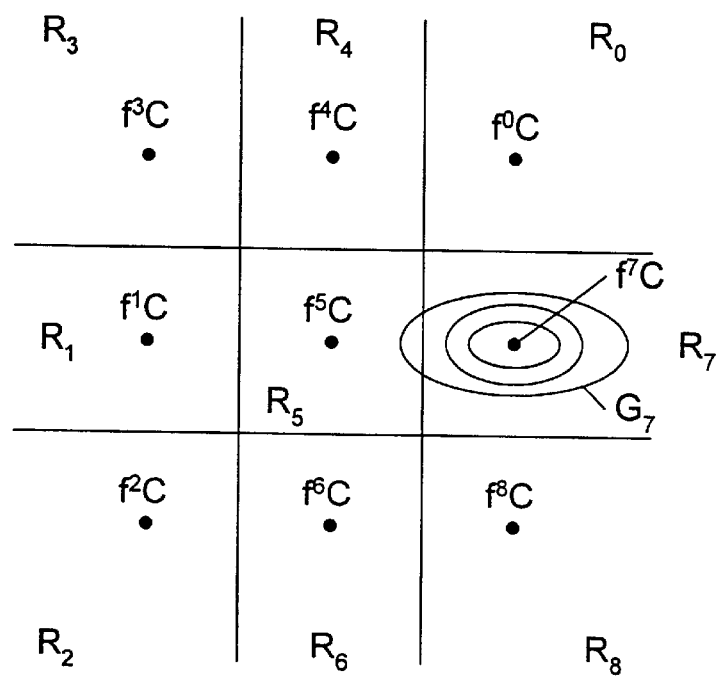
FIG. 12 illustrates a partitioning of the two dimensional image space of FIG. 11 into regions based on proximity to the image vectors.

FIG. 12 is an elaboration of FIG. 11, where the two-dimensional image space is partitioned into regions based on proximity to the image vectors $f^nC$. Coordinate axes have been suppressed for the sake of clarity. Region $R_n$ comprises the points which are closer to the image vector $f^nC$ than to any other of the image vectors $f^mC$, m≠n. For example, the region $R_7$ is the set of points in the image space which are closer to image vector $f^7C$ than to any other of the image vectors. The probability of correct shift estimation given that the shift parameter takes the value d is equal to the integral of the noise object $G_d$ over the region $R_d$. Thus, the probability of correct shift estimation given that the shift value d=7 is equal to the integral of the noise object $G_7$ over region $R_7$. The portion of noise object $G_7$ which lies outside of region $R_7$ contributes to the probability of error in shift estimation. The total probability of correct shift estimation may be expressed as $$P_{total} = \sum_{d=0}^{N-1} \left[ \int_{R_d} G_d dV \right] P_d,$$

where $P_d$ denotes the probability of occurrence of shift value d.

If certain shift values d are known not to occur in a given physical context, the corresponding image vectors $f^dC$ may be excluded from the set P of image vectors. Thus, the image vectors $f^nC$ which are retained in the set P of image vectors will more sparely populate the K-dimensional image space, and some or all of the corresponding regions $R_n$ will increase in size.

The present invention has in view any method for selecting matrix C so as to maximize the total probability $P_{total}$ of correct shift estimation. In particular, the present invention contemplates methods which maximize the minimum of distances of image vectors to their nearest neighbors normalized by the corresponding noise object sizes.

In the case where the noise is multiplicative, the size and shape of the noise object $G_d$ depends on template signal f and shift parameter d as well as matrix C. Thus, noise objects $G_0, G_1, \ldots, G_d, \ldots, G_{N-1}$ will generally have different sizes and shapes. For white, uniform and spike noise, the level curves of the noise object $G_d$ are hyper-ellipses with minor and major axes which depend on template f and shift parameter d.

In the case where the noise is additive, it can be shown that each of the noise objects $G_0, G_1, \ldots, G_d, \ldots, G_{N-1}$ have the same shape, i.e. $G_d(x)=G_0(x-f^dC+f^0C)$ for d equal to 0, 1, 2, ..., N−1. In order to characterize the size of the noise objects, a noise radius $r_n$ may be defined by computing the variance of the radius of vector gC, i.e.

$$r_n^2 = E[(eC)(eC)^t], \quad (6)$$

where E[ ] denotes the expectation operator. (Recall that in the additive noise case, $gC=f^dC+eC$, where e is a row vector representing noise.) If the components of vector e are identically distributed, expression (6) reduces to $$r_n^2 = v \sum_d c_k^t c_k, \quad (7)$$

where v is a constant, and $c_k$ denotes the $k^{th}$ column of matrix C, and the t superscript denotes vector transposition.

The present invention has in view any method for searching the space of N×K matrices to determine a matrix C which maximizes the probability of correct shift estimation. In one embodiment according to the present invention, an objective function Q is defined as $$Q(Y) = \frac{\min\{\|f^iY - f^jY\| : i, j \in V, i \neq j\}}{\sqrt{\sum_k y_k^t y_k}}. \quad (8)$$

In other words, the objective value Q for a candidate matrix Y is determined by computing the minimum of the distances between the image vectors $f^nY$ in the set P, and dividing this minimum distance by the noise radius (or more generally, by some measure of the size of a noise object). It is noted that the summation in the denominator above corresponds to the sum of the squares of all the elements of matrix Y. In order to avoid the evaluation of a square root, the objective function may alternatively be defined as the square of the minimum distance divided by the summation $$\sum_k y_k^t y_k.$$

The present invention contemplates a variety of objective functions which are based on the principle of measuring the ratio of minimum distance to noise object size.

As mentioned in step 122 of FIG. 7A, the space of N×K matrices may be searched for a matrix C which maximizes the objective function Q. This method for selecting the matrix C may be especially useful where the noise is known to be additive. Any iterative search algorithm may be employed. For example, simulated annealing may be used to determine (or approximate) the matrix C which maximizes Q.

Figure 13:
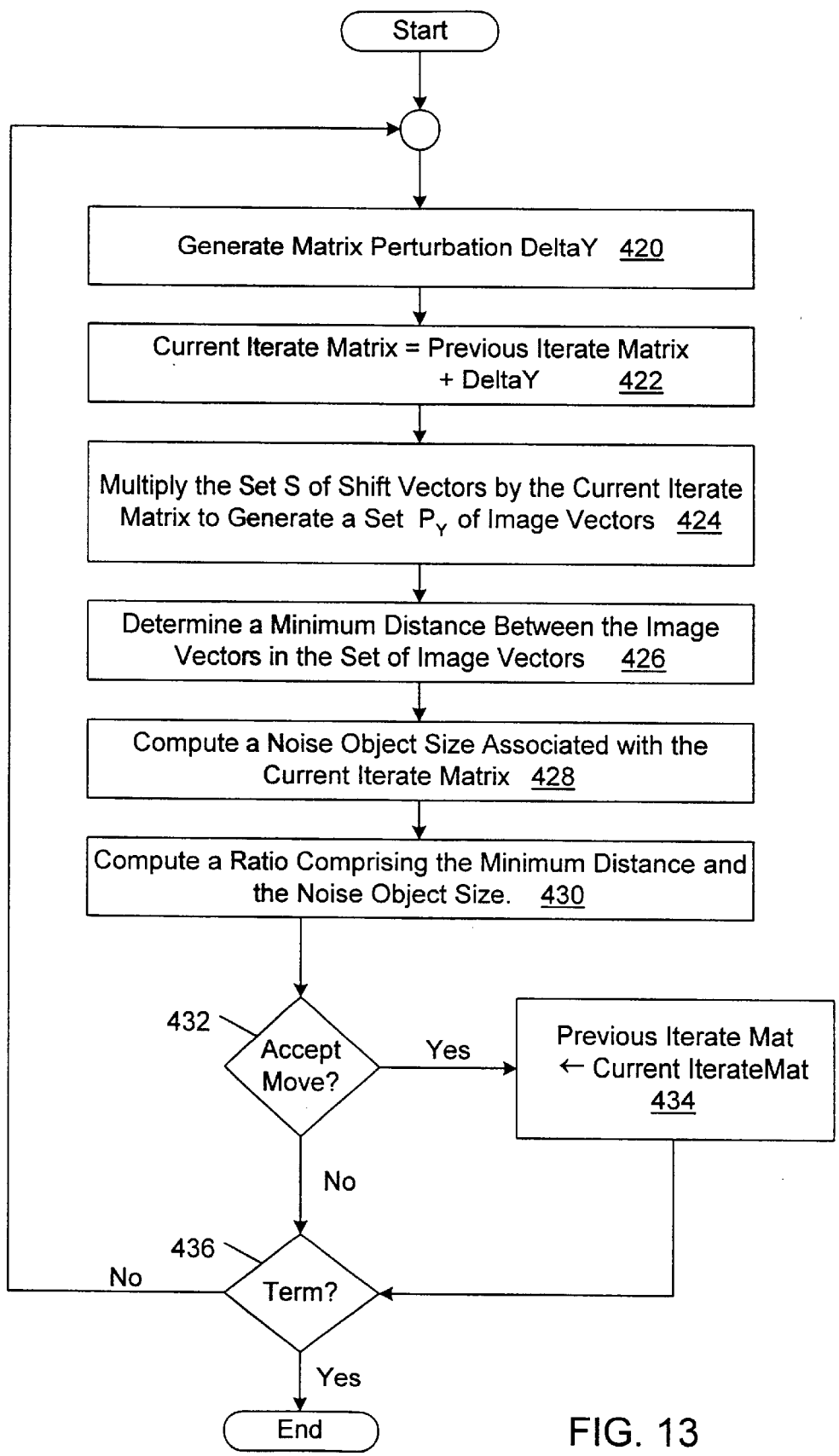
FIG. 13 illustrates an iterative search procedure according to the present invention for computing a matrix C which maximizes an objective function.

FIG. 13 is a flowchart for an iterative search for the matrix C which maximizes objective Q. In step 420, a perturbation matrix DeltaY is generated according to any of a variety of algorithms. For example, in a simulated annealing search, the perturbation matrix may be generated using one or more random variables. In step 422, the perturbation matrix DeltaY is added to a previous iterate matrix, and the sum is assigned to a current iterate matrix Y. The previous iterate matrix is assigned with an initial matrix value prior to the first iteration of step 420.

In step 424, the set $S=\{f^n : n \in V\}$, introduced above in connection with step 125 of FIG. 7A, is multiplied by the current iterate matrix Y to generate a set $P_Y$ of image vectors. In other words, for each n in the index set V, the shift vector $f^n$ is multiplied by the current iterate matrix Y to generate a corresponding image vector $f^nY$ of the set $P_Y$.

In step 426, a minimum of the distances between the image vectors in the set $P_Y$ is computed, i.e. $\min\{\|f^iY - f^jY\| : i, j \in V, i \neq j\}$.

In step 428, a noise object size associated with the current iterate matrix Y is computed. For example, the computation of the noise object size may comprise summing the squares of the elements of the current iterate matrix Y. In one embodiment, the noise object size is a noise radius which is computed by evaluating the square root of the sum of square of the elements of the current iterate matrix Y.

In step 430, the objective function value for the current iterate matrix Y is determined by computing a ratio comprising the minimum distance of step 426 and the noise object size of step 428. For example, the objective function value may be computed by dividing the minimum distance by the noise object size.

In step 432, the objective function value is examined to determine if the current matrix perturbation DeltaY is accepted or rejected. In addition, past history information may be used in the determination of step 432. If the current matrix perturbation is accepted, step 434 is performed. If the current matrix perturbation is rejected, step 436 is performed.

In step 434, the previous iterate matrix is assigned the value of the current iterate matrix. After completion of step 434, step 426 is performed.

In step 436, one or more termination criteria are examined to determine if the iterative search should terminate or continue iterating. If the termination criteria is satisfied, the search algorithm terminates. Otherwise, processing continues with step 420.

The iterative search embodiment of FIG. 13 may be realized as a software routine configured for execution on a processor such as processor 102 of FIG. 6, processor 202 of FIG. 8, processor 208 of FIG. 8, processor 302 of FIG. 9, CPU 402 of FIG. 10, IMAQ board 408 of FIG. 10, Sound Card 412 of FIG. 10, or any of peripherals P1 through Pn of FIG. 10.

It can be shown that the probability of correct shift estimation increases as K increases. However, computational effort also increases with increasing K. Thus, a user of the system and method of the present invention may choose K to balance his/her need for computational speed and noise resistance.

The Second Computational Strategy for Matrix C

Figure 14A:
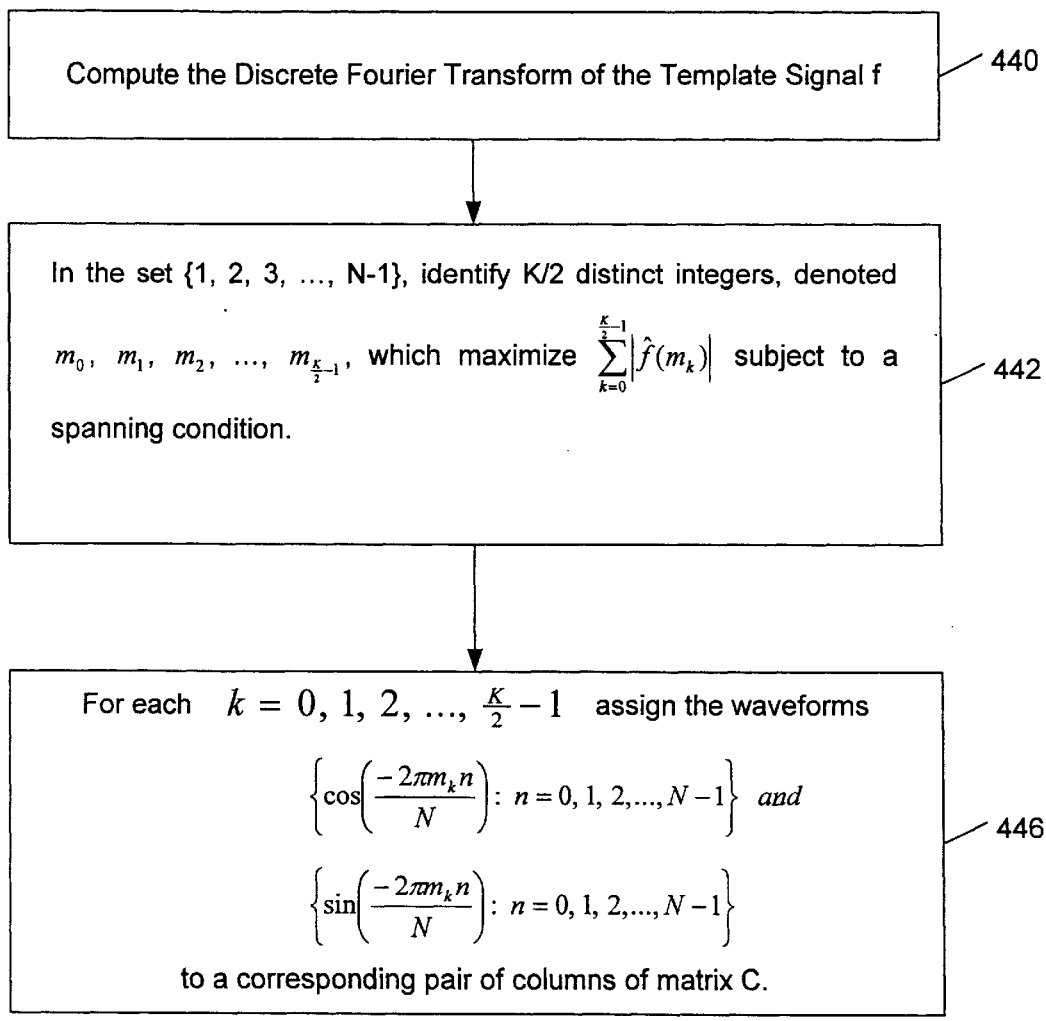
FIG. 14A illustrates an alternate procedure for computing the matrix C according to the present invention.

In step 123 of FIG. 7A, the shift estimation method of the present invention prescribes using a second computational strategy for determining matrix C. The second computational strategy comprises the following steps as illustrated in FIG. 14A. It is noted that he second computational strategy may be applied only when K is even.

In step 440, compute the N-point discrete Fourier transform f̂ of the template signal f, where N is the number of samples defining template signal f.

In step 442, identify K/2 distinct integers, denoted $m_0, m_1, m_2, \ldots, m_{\frac{K}{2}-1}$, from the set $\{1, 2, 3, \ldots, N-1\}$ which maximize $$\sum_{k=0}^{\frac{K}{2}-1} |\hat{f}(m_k)|$$

subject to a spanning condition. In one embodiment, the spanning condition is that the greatest common divisor of the collection $m_0, m_1, m_2, \ldots, m_{\frac{K}{2}-1}$, N is equal to one. In a second embodiment, the spanning condition is that at least one of the integers $m_0, m_1, m_2, \ldots, m_{\frac{K}{2}-1}$ is relatively prime to N. In a third embodiment, the spanning condition is that all of the integers $m_0, m_1, m_2, \ldots, m_{\frac{K}{2}-1}$ are relatively prime to N. It is noted that two integers A and B are said to be relatively prime if their greatest common divisor is one.

As indicated in step 446, for each k equal to $0, 1, 2, \ldots, \frac{K}{2}-1$, assign the waveforms $$\left\{\cos\left(\frac{-2\pi m_k n}{N}\right) : n = 0, 1, 2, \ldots, N-1\right\},$$

$$\left\{\sin\left(\frac{-2\pi m_k n}{N}\right) : n = 0, 1, 2, \ldots, N-1\right\}.$$

to a corresponding pair of columns of matrix C. For example, for each k equal to $0, 1, 2, \ldots, \frac{K}{2}-1$, compute the column vectors $C_{2k}$ and $C_{2k+1}$ of matrix C according to the expressions $$c_{2k}(n) = \cos\left(\frac{-2\pi m_k n}{N}\right),$$

$$c_{2k+1}(n) = \sin\left(\frac{-2\pi m_k n}{N}\right),$$

where row index n varies from zero to N−1. FIG. 14B illustrates this choice for matrix C when K=2.

Signal Analyzer System

It is noted that any of the shift estimation system embodiments shown in FIGS. 6, 8, 9, and 10 may realize a signal analyzer system for analyzing one or more externally ipresented signals. In addition to estimating relative shift between received signals and a template signal the signal analyzer may be configured to perform a variety of signal analysis functions such as Fast Fourier Transforms, Wavelet Transforms, z-Transforms, Hadamard Transforms, energy measurement, etc. The signal analyzer preferably includes one or more high-speed analog-to-digital converters.

Generalization to Nonlinear Operators

The shift estimation method of the present invention comprises projecting a received vector g (with N-components) and circularly-shifted versions of the template vector f (also with N-components) into a space of dimension K less than or equal to N. By determining the projected shifted vector which achieves a minimum distance to the projection of vector g, an estimate for the shift between vector g and template vector f may be obtained. Heretofore, the projection operation has been described in terms of matrix multiplication, i.e. multiplying the received vector g and the shift vectors by an N×K matrix C. However, nonlinear projections are also contemplated.

Thus, step 122 of FIG. 7A may be generalized so that a processor (e.g. processor 102, etc.) searches a space G of projection operators to determine a projection operator T which maximizes an objective function, or which minimizes a penalty function. The space G may comprise linear and/or non-linear operators from N-dimensional space to K-dimensional space, where K is less than or equal to N. In step 124 of FIG. 7A, the user may be allowed to selected a projection operator from a catalog of precomputed operators which may include non-linear operators. In step 125 of FIG. 7A, the processor uses the projection operator T to project the set S of circularly-shifted versions of template signal f into K-dimensional space. Similarly, in step 128 of FIG. 7B, the received vector g is projected into K-dimensional space using the projection operator T.

Linearly Shifted Signals

In some applications, a signal y may be a linearly-shifted and noise-perturbed version of a signal x, i.e. y(n)=U(x(n+τ)), where U is a noise operator, and τ is a linear shift parameter. For these applications, the signal x may be mapped onto a circular signal f by appending N zeros (assuming that the signal x is represented with N samples). For example, a signal represented with 5 samples as x=[7 2 3 1 4] may be zero extended to a circular signal f represented as f=[7 2 3 1 4 0 0 0 0 0]. Similarly, the signal y may be mapped onto a circular signal g by appending N zeros (again assuming the signal y is represented by N samples). Then the circular shift-estimation method of the present invention may be used to estimate the linear-shift τ. However, it is noted that when constructing the matrix F of circularly-shifted versions $f^k$ of signal f, only the first N values of the shift parameter need to be considered.

An Image Processing Application

Figure 15A:
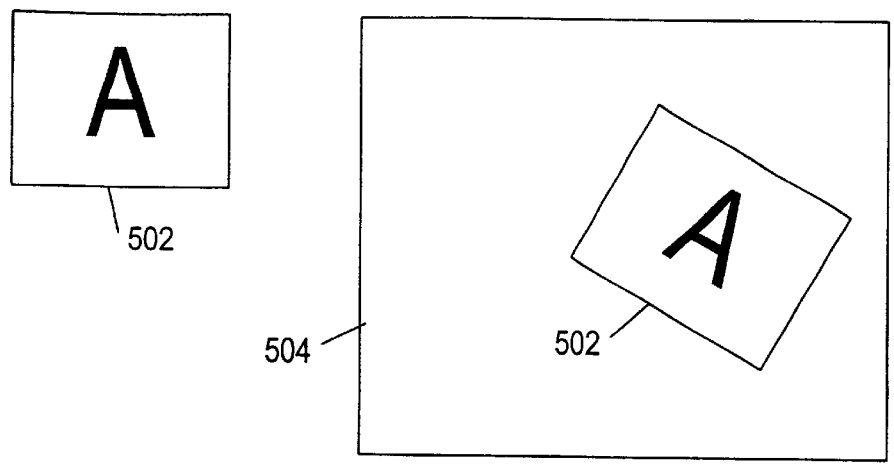
FIGS. 15A–15C illustrate an image processing application based on the shift estimation system and method of the present invention.
Figure 15B:
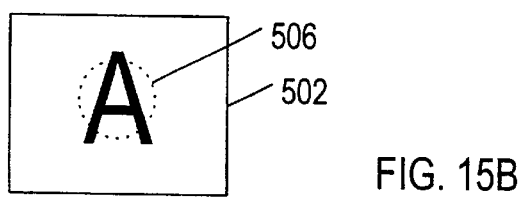
Figure 15C:
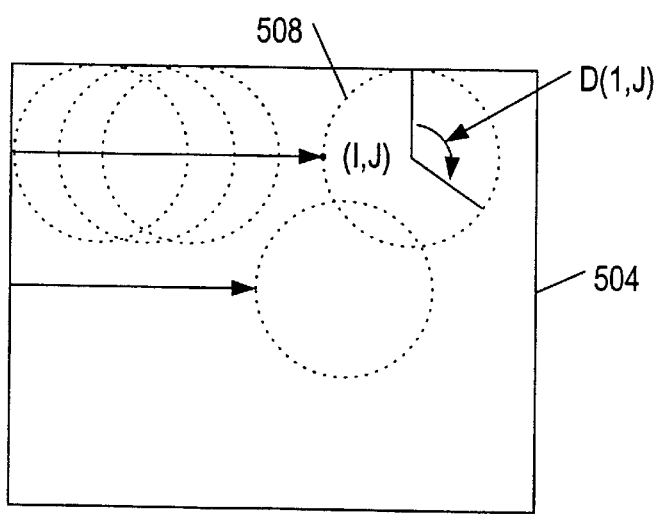

The circular shift-estimation method of the present invention may be used to detect the location of a template image embedded with arbitrary displacement and orientation in another image. For more information on a system and method for performing pattern matching to locate rotated and/or scaled instances of a template image in a target image, please see U.S. patent application Ser. No. 09/227, 507, titled "Pattern Matching System and Method Which Detects Rotated and Scaled Template Images", filed Jan. 6, 1999, invented by Lothar Wenzel et al., assigned to National Instruments Corporation which is hereby incorporated by reference as through fully and completely set forth herein. FIG. 15A illustrates a template image 502 and a second image 504. The template image is embedded in the second image 504. Given the pixel values of the second image 504, the shift-estimation method of the present invention may be used to detect the location and orientation of the template image 502 in the second image 504.

Figure 16:
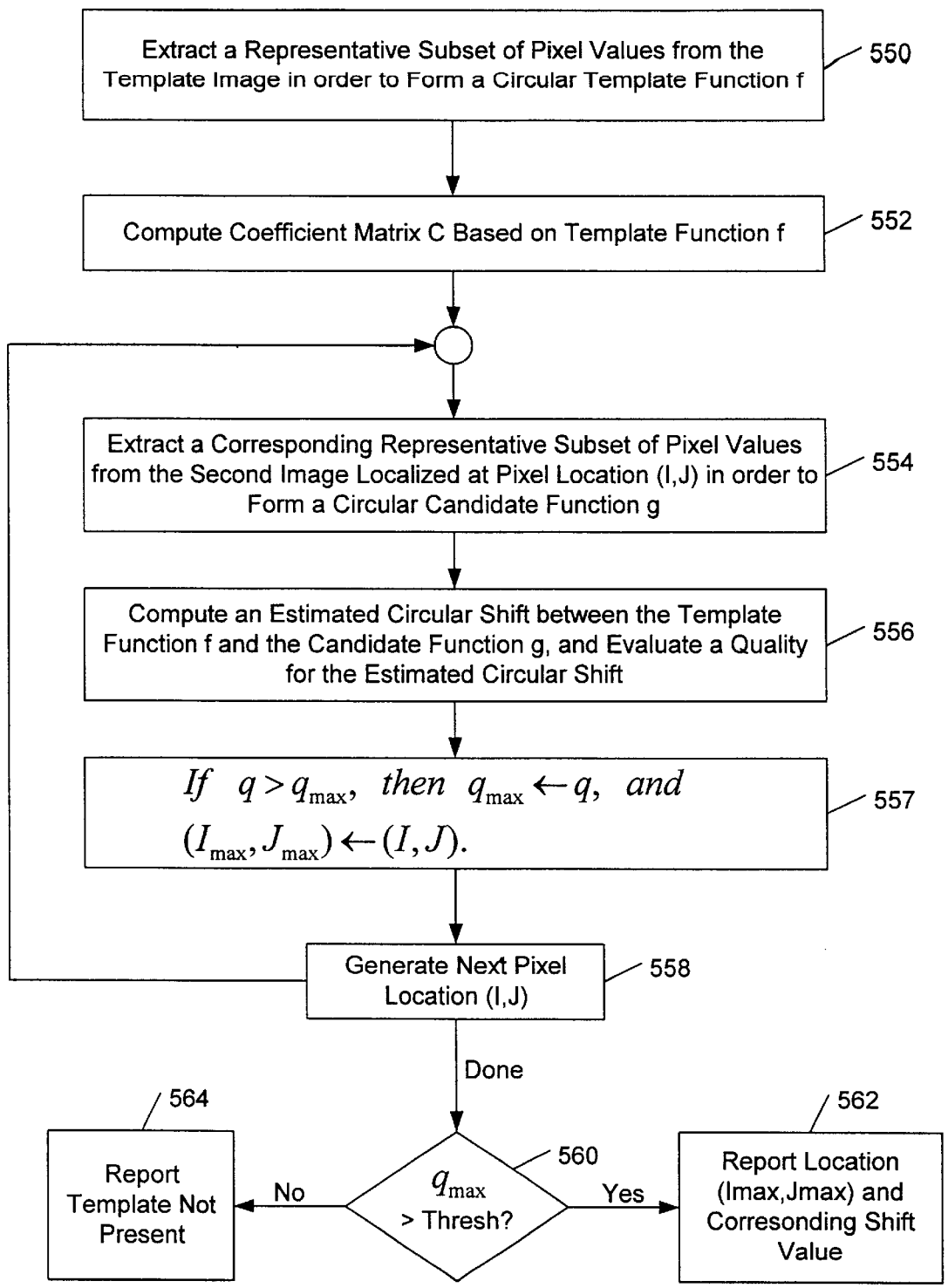
FIG. 16 illustrates a computational method for detecting the location and orientation of an embedded image in an ambient image according to the present invention.

FIG. 16 presents a flowchart for an image detection method according to the present invention. The image detection method may be implemented in software for execution on one or more processors (e.g. processor 102 of FIG. 6, either or both of the processors 202 and 208 of FIG. 8, CPU 402 of FIG. 10, or image acquisition board 408 of FIG. 10). Alternatively, any or all of the steps of the image detection method may be implemented in dedicated hardware such as an FPGA.

In step 550, a representative subset 506 of pixel values is extracted from the template image 502 in order to form a circular template signal f. The representative subset 506 may be a circle. However, other shapes are contemplated for the representative subset 506. The representative subset 506 may be an arbitrary collection of points sampled from template image 502.

In step 552, a matrix C is computed based on the template signal f. In the preferred embodiment, the matrix C is computed by optimizing the objective function Q as discussed above. The image space dimension K may be chosen to be a small value such as four, since the computational effort for the shift estimation is proportional to K.

In step 554, a representative subset 508 of pixel values localized at a pixel location (I,J) is extracted from the second image 504. The representative subset 508 is preferably chosen so as to match the geometry (i.e. size and shape) of the representative subset 506 extracted from template image 502. A circular candidate signal g is formed from the representative subset 508 of pixel values. Candidate signal g may be stored as a vector, i.e. a one-dimensional array.

In step 556, an estimated circular shift D(I,J) is computed between the template signal f and the candidate signal g using the shift estimation method according to the present invention as described in connection with FIG. 7B. In addition, a quality value q may be computed for the estimated circular shift D(I,J) by evaluating the expression $$q = \frac{\|f^{D(I,J)}C - gC\|}{\sqrt{\sum_k c_k^t c_k}},$$

where $f^{D(I,J)}$ denotes the template signal f circularly shifted by D(I,J) positions. In other words, the quality value q is determined by computing the distance between image vector $f^{D(I,J)}C$ and image vector gC, and this distance is divided by the noise radius (or more generally, by some measure of the size of a noise object). Alternatively, the quality value q may be defined as $$q = \frac{\|f^{D(I,J)}C - gC\|^2}{\sum_k c_k^t c_k}.$$

This second definition advantageously avoids the computation of a square root.

In step 557, the quality value q is compared to a maximum quality $q_{max}$. If the quality value q is greater than the maximum quality, the maximum quality $q_{max}$ is assigned the quality value q, and the pixel location $(I_{max}, J_{max})$ of the maximum is updated to the current pixel location (I,J).

In step 558, the next pixel location (I,J) is generated. For example, the horizontal pixel index I may be incremented. When the end of a horizontal row has been reached, the next pixel location (I,J) may be generated by incrementing the vertical pixel index J and setting the horizontal pixel index I to zero. After step 558, processing continues with step 554. Thus, steps 554 through 557 are repeated for a series of pixel locations (I,J). When the last pixel location (Ilast,Jlast) for the second image 504 has been processed, processing continues with step 560.

In step 560, the maximum quality $q_{max}$ is compared to a predetermined threshold value. If the maximum quality $q_{max}$ is greater than the predetermined threshold, step 562 is performed. Otherwise step 564 is performed.

In step 562, the pixel location $(I_{max}, J_{max})$ of the maximum quality, and the shift value $D(I_{max}, J_{max})$ of the corresponding candidate signal g, are reported as outputs for the image detection method. The pixel location $(I_{max}, J_{max})$ defines the estimated location of the embedded image 502 in the ambient image 504. The shift value $D(I_{max}, J_{max})$ defines the estimated orientation of the embedded image 502 in the ambient image 504.

In step 564, a report is issued indicating that the template image was not detected in the second image 504.

Identifying the Minimizing Image Vector

The present invention contemplates at several methods for identifying the minimizing image vector $f^d C$ with minimum distance to the projection vector gC. According to a first method, a direct computation of the dot product $(gC) \cdot (f^d C)$ is performed for each possible shift value d from zero to N−1. Then, the shift value d which gives the maximum dot product is determined. Each of the dot products requires K scalar products (i.e. multiplies). Thus, the first method requires KN products.

Memory Based Distance Estimation

According to a second method for estimating the minimizing image vector, a processor with external I/O and some memory available to it may be used. Usually the memory is large enough, so that even after all the setup for the algorithm and other pre and post processing is performed, a considerable fraction is left unused. This memory could be used in order to increase the speed of the distance estimation phase of the algorithm. Increasing the speed involves reducing the amount of computation.

It is noted that the calculations comprising the setup phase may be performed offline, and thus, do not influence the online efficiency. Thus, computational effort may be transferred from the distance estimation to the setup with a consequent increase in computational efficiency.

Figure 17:
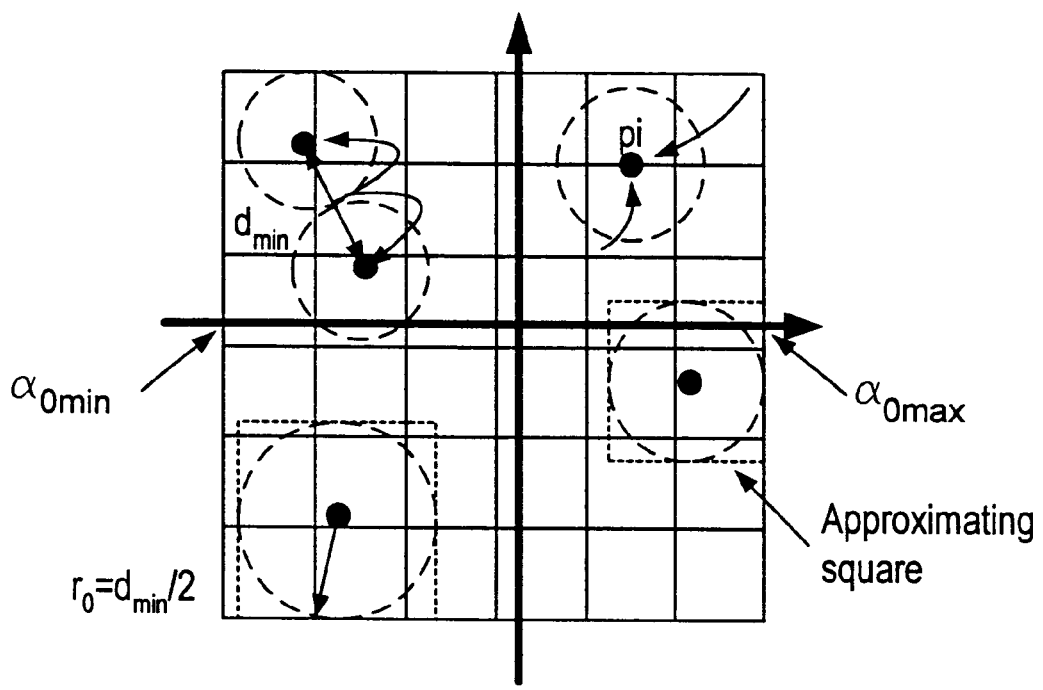
FIG. 17 illustrates a grid setup for a memory based distance estimation method according to the present invention.

This is the idea behind the memory based distance estimation method. In this method, the alpha space (i.e. the K-dimensional image space) is divided into a rectangular grid. Each of the k dimensions is divided into a corresponding number $S_k$ of segments of equal size. Usually, the choice $S_k=S$ is very reasonable. The boundaries $\alpha_{kmin}$ and $\alpha_{kmax}$ can be defined in different ways. Usually though $\alpha_{kmin}$ and $\alpha_{kmax}$ can be found for each dimension from the alpha matrix (i.e. the A matrix whose rows comprise the image vectors) as presented in equation 6.5. FIG. 17 illustrates the grid setup.

$$\alpha_{k\,min} = \min_r \alpha(r,k) - r_o \quad (6.5)$$
$$\alpha_{k\,max} = \max_r \alpha(r,k) + r_o$$

The next step after defining the grid, is to associate each grid element to the possible candidates. Each grid element represents a spatial unit, and therefore can be associated to the possible minimum distance candidates.

The unrestricted case is not straightforward to setup, and is not very efficient either. The problem is to define all the possible candidates for each grid unit, especially at higher dimensions. If the grid units are small enough, this is not a problem. But if not, then it is not a simple task to identify all possible candidates. As the unrestricted case is not as interesting in terms of the circular shift-estimation method, this discussion will focus on the restricted cases.

In contrast to the unrestricted cases, the restricted and variant restricted distance estimations can be setup in a straightforward fashion. Basically, the object of size $r_o$ is defined such that it satisfies the restricted distance or variant restricted distance estimation conditions. Then for each point $p_i$ on the set P, mark the grids that are spanned by the object centered on that point. Marking a grid simply implies setting a pointer from the grid to the point $p_i$. If any object does not span a certain grid element, then that grid is set to a NULL pointer. Therefore, if a test point falls in that grid, it is marked as an error. Usually it is common to assume Euclidean norm as the distance measure. Thus the object will be a sphere, and the radius gives its size. In the restricted case, the radius is $$r_o = \frac{d_{min}}{2},$$

where $d_{min}$ is the minimum distance between two points in P. In the variant case, the sphere associated with each point $p_i$ has a different radius, given by equation 6.7.

$$r_i = \frac{1}{2}\min_r \|p_r - p_i\|_2 \quad (6.7)$$

If reducing the setup time is desired, an easier algorithm might be obtained if hypercubes are used to approximate the hyperspheres, such that the cube has the same center, and side L=2r. If hypercubes are used, checking whether or not a grid points to a certain point $p_i$ is just a matter of a few comparisons. This can even be made more efficient by implementing an adequate representation for the grid.

A conflict situation might arise as grid elements may be spanned by more than one object. In this case multiple pointers are set. When a test point falls inside such a grid, computing the distance (or a dot product) between the test point and the possible candidates solves the resulting conflict.

FIG. 17 shows a hypothetical setup and the resulting grid and pointers.

The grid size S should be determined by taking into consideration the number of points in P and the amount of memory available. The more grid elements implies more memory usage. In contrast, the probability that a grid points to multiple candidates is also reduced. The proposed algorithm works because multiple pointers are a special case, and rarely will any grid point to more than a small fraction of points in P, as long as a reasonable grid size is chosen. For example, for K=4 and N=61 (number of points in P), if S=10 is chosen, then the grid density is only 0.6%. The grid density is defined as the ratio between the number of points and the number of grid elements.

Sparse sets are encountered often when using the circular cross-correlation algorithm of the present invention. Usually these sets are also evenly distributed, so the grid density is a reasonable measure.

Actually by means of a simple geometric argument, it can almost be guaranteed that a grid points only to a single candidate if the grid size is set as $$S = \max_k \left[3\frac{\alpha_{kmax} - \alpha_{kmin}}{d_{min}}\right].$$

Figure 18A:
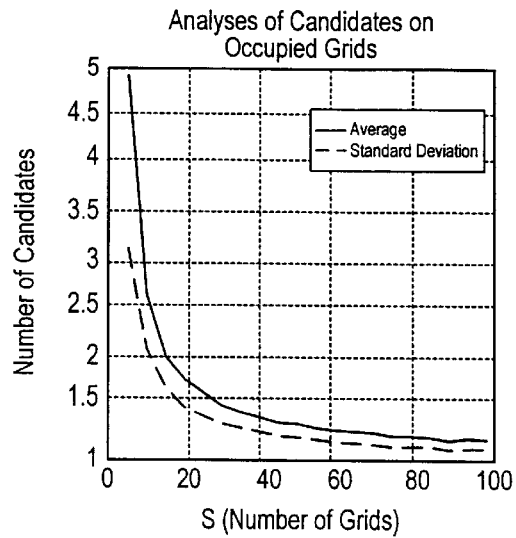
FIGS. 18A–18D present statistics for the memory based distance estimation method according to the present invention.
Figure 18B:
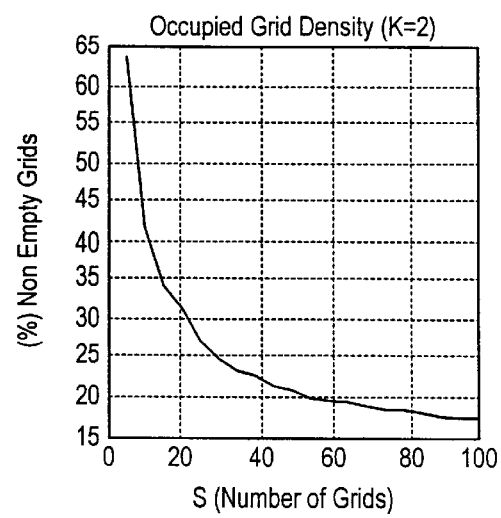
Figure 18C:
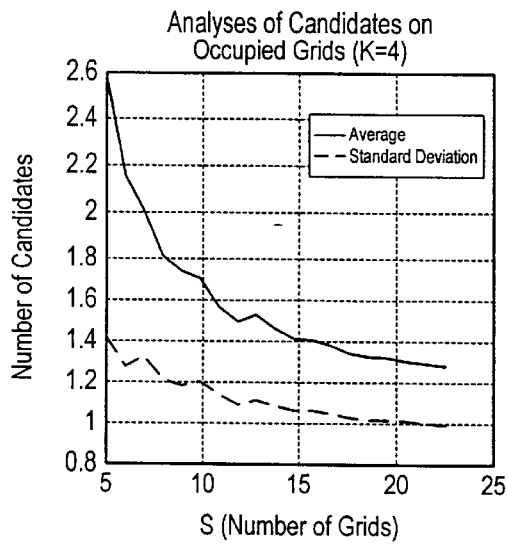
Figure 18D:
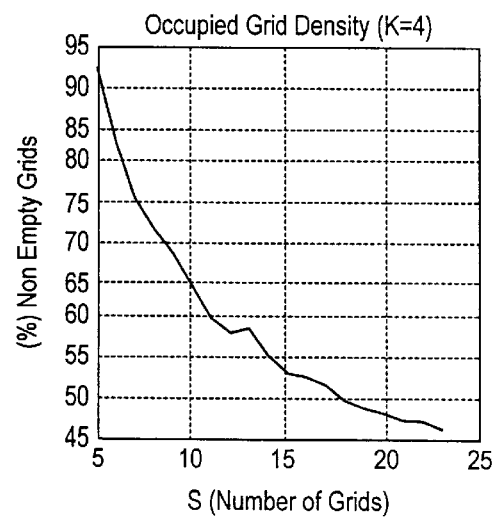

FIGS. 18A–18D present statistics for the signal used in previous examples. As given above, N=61. Three different selections for the projection matrix C (also referred to as the gamma matrix) are under consideration. In FIGS. 18A and 18B, K=2 and K=4 respectively, and the projection matrix C is set according to the generalized Fourier model, and in FIG. 18D the matrix C is equated to the identity matrix. Each figure contains the setup for different grid sizes. Notice that when K=2 a much finer grid is needed to reduce considerably the computing effort. But still the density ratio was close to 1%, for S=100.

It is important to reiterate that the setup for the projection matrix C in the example is not very favorable to this memory based estimation model, as at low dimensions the image vectors tend to be close together. Also there is a strong symmetry, which in a sense forces every grid to have many candidates.

Figure 19:
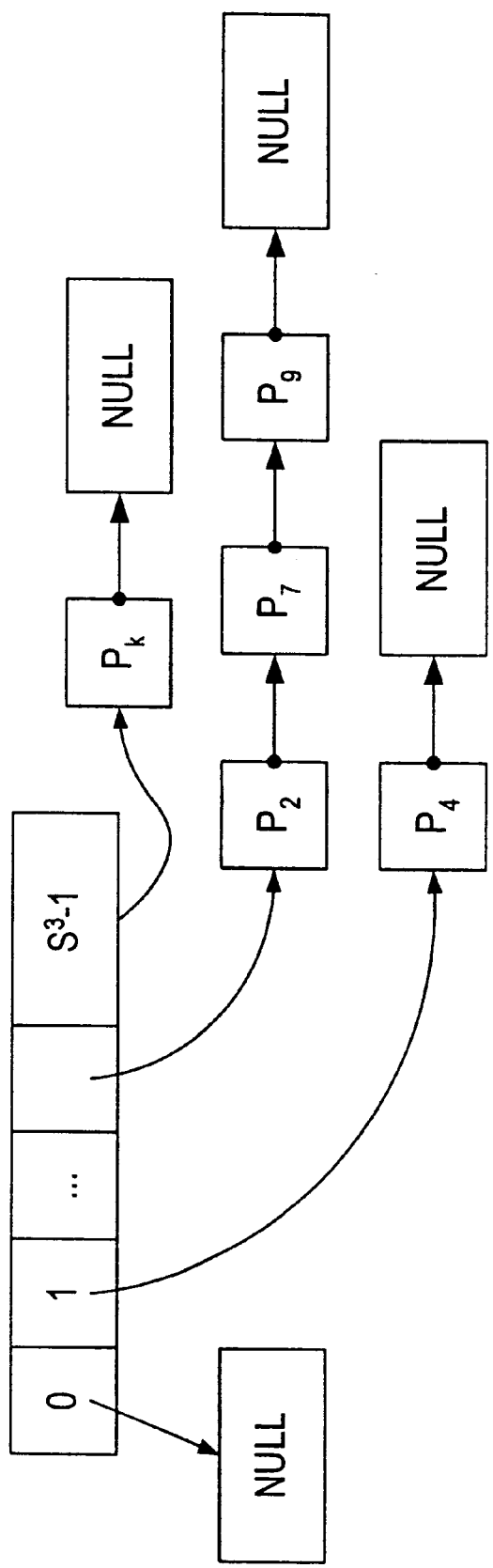
FIG. 19 presents a schematic diagram for the memory based distance estimation method according to the present invention.

A memory based estimation procedure can be readily implemented by means of a array of pointers to linked lists. Each element in the vector can be uniquely associated to a grid, by means of a simple linear transform. The grid to which a test point belongs can be quickly determined by the following equations:

$$\bar{p}=(p_0,\ldots,p_{K-1}) \quad (6.8A)$$

$$m_k = \frac{p_0 - \alpha_{kmin}}{\alpha_{kmax} - \alpha_{kmin}} S \quad (6.8B)$$

$$\text{index} = \sum_{k=0}^{K-1} S^k m_k \quad (6.8C)$$

where index is the index into the array of linked lists. Each element of the vector is a pointer to a linked list. The elements of the linked list are simply pointers to the candidates. As can be seen, even this simple straightforward implementation is not extremely memory intensive, but needs a certain amount of memory, which grows exponentially with the dimension K of the image space, and with S. A schematic of this implementation can be seen on FIG. 19.

Randomized Distance Estimation Algorithm

Figure 20:
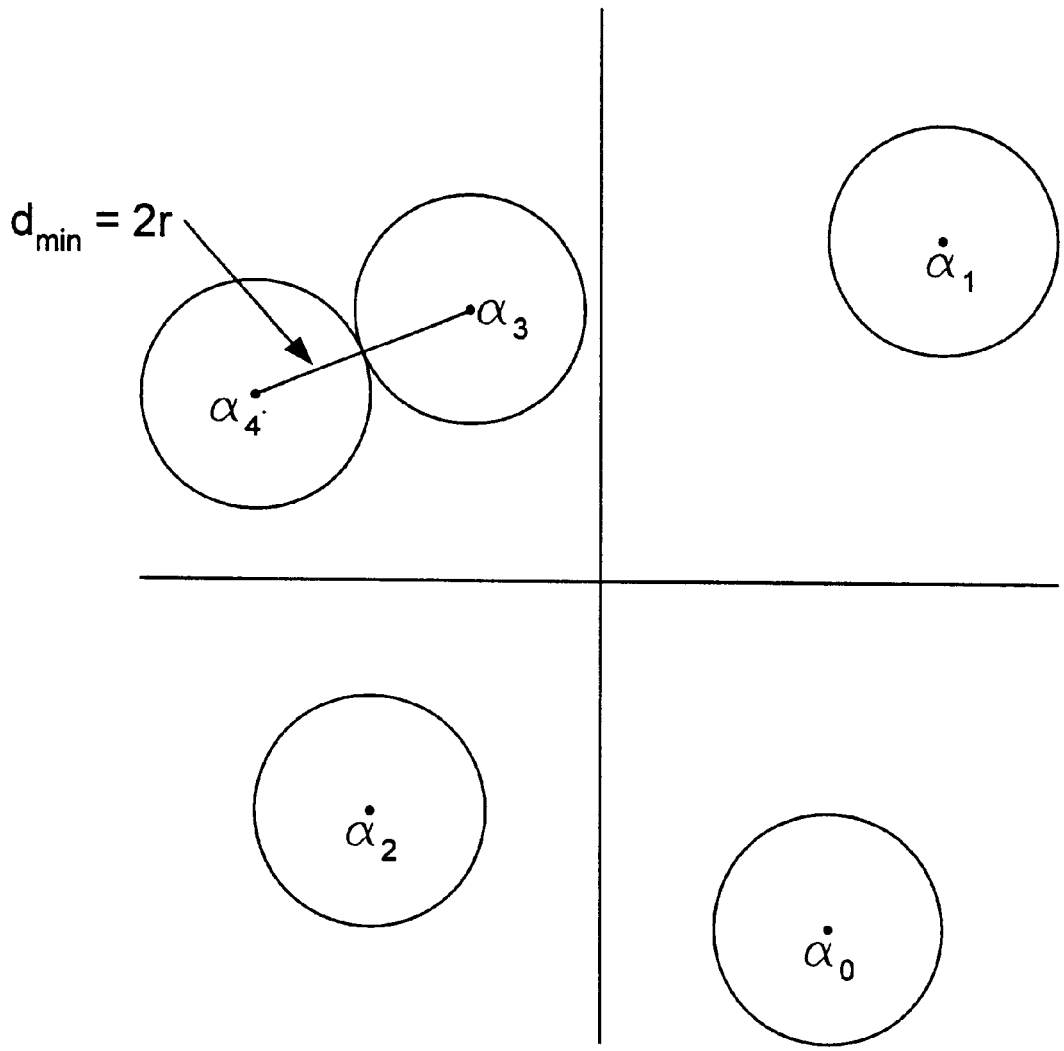
FIG. 20 illustrates a collection of image vectors (also referred to as alpha vectors) in a two-dimensional image space, where each image vector is the center for a sphere of radius $d_{min}/2$, where $d_{min}$ is the minimum of distances between image vectors.

According to a third method for estimating the minimizing image vector, a randomized algorithm may be used. This third method may be suitable for environments where memory capacity is small. The minimum distance $d_{min}$ between alpha vectors (i.e. image vectors) may be computed. The radius $r=d_{min}/2$ may be defined in terms of the minimum distance as suggested by FIG. 20. Then, the matrix of distances between alpha vectors may be computed and stored. The randomized algorithm may be described as follows.

(1) Given a vector $\overline{\alpha}$ (or X), select randomly one of the alpha vectors $\alpha_i$. Compute the distance $$\text{dist}(\overline{\alpha}, \alpha_i) = \sqrt{\|\overline{\alpha} - \alpha_i\|^2}$$

which may be computed according to the expression $$\sum_k \overline{\alpha}^2 + \sum_k \alpha_i^2 + 2\sum_k \overline{\alpha} \cdot \alpha_i.$$

It is noted that the first summation above only needs to be computed once. Similarly, the second summation above only needs to be computed once and then stored. If dist<r, then the candidate has already been found. Otherwise perform step (2).

(2) Eliminate the current candidate from the candidate list, and also all candidates such that $S_i+r>\text{dist}$ and $S_i-r<\text{dist}$, where $S_i=\text{dist}(\alpha_B, \alpha_i)$, where $\alpha_B$ is the alpha vector selected in the previous step.

Usually, this method is very efficient. For example, when K=4 with a random universe, this method requires only 16 multiplications (i.e. 4 times 4) at the worst case. The average case requires approximately 10 multiplications instead of KN=(4)(61)=244 multiplications for the first distance estimation method (i.e. the direct method).

In summary, the direct computation method has a computational cost of KN. The memory based estimation method has a computational cost of K(N+1), or the worst case average cost. The randomized algorithm has a computational cost of K(N+L) where L depends on K, and on the structure of the alpha vectors (i.e. image vectors) sitting in the K-dimensional image space. For example, when K=4 and the image vectors are chosen randomly, it can be shown that L=3. Thus, the shift estimation methods of the present invention may advantageously achieve a computational cost which is O(N), in contrast with prior art methods which require $O(N^2)$ or O(N log N).

Although the system and method of the present invention has been described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A method for estimating a shift between two signals, the method comprising:

(a) receiving a first signal g, wherein the first signal g comprises a sequence of values which are representable as a vector g having N components;

(b) projecting the vector g to a space with dimension K less than N to obtain a projection vector X having K components;

(c) computing measures of distance between the projection vector X and a set of stored vectors, wherein each of the stored vectors is associated with a corresponding vector in a collection of shift vectors, wherein each of the shift vectors is a shifted version of a second signal f;

(d) determining a first stored vector in the set of stored vectors with a minimum distance to the projection vector X based on the measures of distance;

(e) providing a first shift value corresponding to the first stored vector, wherein the first shift value is an estimate of a shift between the first signal g and the second signal f.

2. The method of claim 1, wherein said shift represents a time-delay between the first signal g and the second signal f.

3. The method of claim 1 further comprising generating the set of stored vectors, wherein said generating comprises projecting the collection of shift vectors to the space with dimension K less than N.

4. The method of claim 3, wherein said first stored vector is generated by projection of a first shift vector in said collection of shift vectors, wherein the first shift value defines an amount by which the second signal f is shifted to obtain the first shift vector.

5. The method of claim 3 wherein said projecting the collection of shift vectors to the space comprises multiplying each shift vector in said collection by a matrix C.

6. The method of claim 5, wherein said projecting the vector g to a space to obtain a projection vector X comprises multiplying the vector g by the matrix C.

7. The method of claim 5 further comprising computing the matrix C prior to said projecting the vector g to the space with dimension K less than N, wherein said computing the matrix C includes performing an iterative search to determine a first matrix which maximizes an objective function.

8. The method of claim 7, wherein a simulated annealing algorithm is used to perform said iterative search.

9. The method of claim 7, wherein each iteration of the iterative search comprises evaluating the objective function on a current iterate matrix Y, wherein said evaluating comprises:

multiplying the set of shift vectors by the current iterate matrix Y to generate a set of image vectors;

computing a minimal distance between the image vectors in the set of image vectors;

computing a noise object size associated with the current iterate matrix Y;

computing a ratio comprising the minimal distance and the noise object size.

10. The method of claim 9, wherein said computing a noise object size comprises computing the sum of the squares of the elements of the current iterate matrix Y.

11. The method of claim 5 further comprising computing the matrix C prior to said projecting the vector g to the space with dimension K less than N, wherein said computing the matrix C comprises:

computing a Fourier transform of the second signal f;

identifying a collection of K/2 distinct integers in the range from 1 to N−1 which maximize a sum of magnitudes of the Fourier transform evaluated on the collection of K/2 distinct integers subject to a spanning condition;

for each integer m of the K/2 distinct integers, assigning the cosine and sine waveforms with frequency m to a pair of columns of matrix C.

12. The method of claim 11, wherein the spanning condition is that the greatest common divisor of N and the collection of K/2 distinct integers is one.

13. The method of claim 11, wherein the spanning condition is that at least one of the K/2 distinct integer is relatively prime to N.

14. The method of claim 1, wherein each of the shift vectors are circularly-shifted versions of second signal f.

15. The method of claim 1, wherein said computing measures of distance between the projection vector X and the set of stored vectors comprises computing an $L^1$ distances between the projection vector X and each vector in the set of stored vectors.

16. The method of claim 1, wherein said computing measures of distance between the projection vector X and the set of stored vectors comprises computing dot products between the projection vector X and each vector in the set of stored vectors.

17. The method of claim 1, wherein (a), (b), (c), (d) and (e) are implemented by a processor executing under the control of a software shift estimation routine.

18. The method of claim 1, wherein (a), (b), (c), (d) and (e) are implemented by a Field Programmable Gate Array (FPGA).

19. The method of claim 1, wherein the first signal g comprises first pixel data extracted from a first image, and the second signal f comprises second pixel data extracted from a second image, wherein said first shift value indicates an estimated orientation of the first image with respect to the second image.

20. The method of claim 1, wherein (a), (b), (c), (d) and (e) are performed repeatedly for a series of signals including the first signal g.

21. The method of claim 1, wherein said determining a first stored vector in the set of stored vectors with a minimum distance to the projection vector X comprises:
    computing dot products between the projection vector X and each of the stored vectors; and
    selecting the stored vector in the set of stored vectors which maximizes the dot projects as the first stored vector.

22. The method of claim 1, wherein the first signal g comprises samples of received radar reflection, wherein the second signal f comprises samples of a transmitted radar pulse, wherein said first shift value indicates an estimated time of propagation between transmission of the transmitted radar pulse and reception of the radar reflection, wherein the first shift value is used to compute a distance to an object which generates the radar reflection.

23. The method of claim 1 further comprising providing an output to a user in response to the first shift value.

24. A computer-implemented method for estimating a shift between two signals, the method comprising:
    (a) receiving a first signal g, wherein the first signal g comprises a sequence of values which are representable as a vector g having N components;
    (b) projecting the vector g to a space with dimension K less than N to obtain a projection vector X having K components;
    (c) computing measures of distance between the projection vector X and a set of stored vectors, wherein each of the stored vectors is associated with a corresponding vector in a collection of shift vectors, wherein each of the shift vectors is a shifted version of a second signal f;
    (d) determining a first stored vector in the set of stored vectors with a minimum distance to the projection vector X based on the measures of distance;
    (e) providing a first shift value corresponding to the first stored vector, wherein the first shift value is an estimate of a shift between the first signal g and the second signal f.

25. A signal analyzer system comprising:
    a memory configured to store a shift estimation routine
    a processor coupled to the memory and configured to execute the shift estimation routine, wherein, in response to the shift estimation routine executing on said processor, said processor is configured to:
        (a) receive a first signal g, wherein the first signal g comprises a sequence of values which are representable as a vector g having N components;
        (b) project the vector g to a space with dimension K less than N to obtain a projection vector X having K components;
        (c) compute measures of distance between the projection vector X and a set of stored vectors, wherein each of the stored vectors is associated with a corresponding vector in a collection of shift vectors, wherein each of the shift vectors is a shifted version of a second signal f;
        (d) determine a first stored vector in the set of stored vectors with a minimum distance to the projection vector X based on the measures of distance;
        (e) provide a first shift value corresponding to the first stored vector, wherein the first shift value is an estimate of a shift between the first signal g and the second signal f.

26. The signal analyzer of claim 25, wherein, in response to the shift estimation routine executing on said processor, said processor is further configured to generate the set of stored vectors by multiplying each shift vector in said collection by a matrix C.

27. The signal analyzer of claim 25, wherein said processor projects the vector g to the space by multiplying the vector g with the matrix C.

28. The signal analyzer of claim 25, wherein, in response to the shift estimation routine executing on said processor, said processor is further configured to compute the matrix C prior to said projecting the vector g to the space with dimension K less than N, wherein said computing the matrix C includes performing an iterative search to determine a first matrix which maximizes an objective function.

29. The signal analyzer of claim 25, wherein, in response to the shift estimation routine executing on said processor, said processor is further configured to compute the matrix C prior to said projecting the vector g to the space with dimension K less than N, wherein said computing the matrix C includes:
    computing a Fourier transform of the second signal f;
    identifying a collection of K/2 distinct integers in the range from 1 to N−1 which maximize a sum of magnitudes of the Fourier transform evaluated on the collection of K/2 distinct integers subject to a spanning condition;
    for each integer m of the K/2 distinct integers, assigning the cosine and sine waveforms with frequency m to a pair of columns of matrix C.

30. A memory medium comprising program instructions for estimating a shift between two signals, wherein the program instructions are executable to implement:
    (a) receiving a first signal g, wherein the first signal g comprises a sequence of values which are representable as a vector g having N components;
    (b) projecting the vector g to a space with dimension K less than N to obtain a projection vector X having K components;
    (c) computing measures of distance between the projection vector X and a set of stored vectors, wherein each of the stored vectors is associated with a corresponding vector in a collection of shift vectors, wherein each of the shift vectors is a shifted version of a second signal f;

(d) determining a first stored vector in the set of stored vectors with a minimum distance to the projection vector X based on the measures of distance;

(e) providing a first shift value corresponding to the first stored vector, wherein the first shift value is an estimate of a shift between the first signal g and the second signal f.

31. The memory medium of claim 30, wherein said shift represents a time-delay between the first signal g and the second signal f.

32. The memory medium of claim 30, wherein the program instructions are further executable to implement:
generating the set of stored vectors, wherein said generating comprises projecting the collection of shift vectors to the space with dimension K less than N.

33. The memory medium of claim 32, wherein said first stored vector is generated by projection of a first shift vector in said collection of shift vectors, wherein the first shift value defines an amount by which the second signal f is shifted to obtain the first shift vector.

34. The memory medium of claim 32, wherein said projecting the collection of shift vectors to the space comprises multiplying each shift vector in said collection by a matrix C.

35. The memory medium of claim 34, wherein said projecting the vector g to a space to obtain a projection vector X comprises multiplying the vector g by the matrix C.

36. The memory medium of claim 34, wherein the program instructions are further executable to implement:
computing the matrix C prior to said projecting the vector g to the space with dimension K less than N, wherein said computing the matrix C includes performing an iterative search to determine a first matrix which maximizes an objective function.

37. The memory medium of claim 36, wherein a simulated annealing algorithm is used to perform said iterative search.

38. The memory medium of claim 36, wherein each iteration of the iterative search comprises evaluating the objective function on a current iterate matrix Y, wherein said evaluating comprises:
multiplying the set of shift vectors by the current iterate matrix Y to generate a set of image vectors;
computing a minimal distance between the image vectors in the set of image vectors;
computing a noise object size associated with the current iterate matrix Y;
computing a ratio comprising the minimal distance and the noise object size.

39. The memory medium of claim 38, wherein said computing a noise object size comprises computing the sum of the squares of the elements of the current iterate matrix Y.

40. The memory medium of claim 34, wherein the program instructions are further executable to implement:
computing the matrix C prior to said projecting the vector g to the space with dimension K less than N, wherein said computing the matrix C comprises:
computing a Fourier transform of the second signal f;
identifying a collection of K/2 distinct integers in the range from 1 to N−1 which maximize a sum of magnitudes of the Fourier transform evaluated on the collection of K/2 distinct integers subject to a spanning condition;
for each integer m of the K/2 distinct integers, assigning the cosine and sine waveforms with frequency m to a pair of columns of matrix C.

41. The memory medium of claim 40, wherein the spanning condition is that the greatest common divisor of N and the collection of K/2 distinct integers is one.

42. The memory medium of claim 40, wherein the spanning condition is that at least one of the K/2 distinct integer is relatively prime to N.

43. The memory medium of claim 30, wherein each of the shift vectors are circularly-shifted versions of second signal f.

44. The memory medium of claim 30, wherein said computing measures of distance between the projection vector X and the set of stored vectors comprises computing an $L^1$ distances between the projection vector X and each vector in the set of stored vectors.

45. The memory medium of claim 30, wherein said computing measures of distance between the projection vector X and the set of stored vectors comprises computing dot products between the projection vector X and each vector in the set of stored vectors.

46. The memory medium of claim 30, wherein the first signal g comprises first pixel data extracted from a first image, and the second signal f comprises second pixel data extracted from a second image, wherein said first shift value indicates an estimated orientation of the first image with respect to the second image.

47. The memory medium of claim 30, wherein (a), (b), (c), (d) and (e) are performed repeatedly for a series of signals including the first signal g.

48. The memory medium of claim 30, wherein said determining a first stored vector in the set of stored vectors with a minimum distance to the projection vector X comprises:
computing dot products between the projection vector X and each of the stored vectors; and
selecting the stored vector in the set of stored vectors which maximizes the dot projects as the first stored vector.

49. The memory medium of claim 30, wherein the first signal g comprises samples of received radar reflection, wherein the second signal f comprises samples of a transmitted radar pulse, wherein said first shift value indicates an estimated time of propagation between transmission of the transmitted radar pulse and reception of the radar reflection, wherein the first shift value is used to compute a distance to an object which generates the radar reflection.

50. The memory medium of claim 30, wherein the program instructions are further executable to implement:
providing an output to a user in response to the first shift value.

51. A memory medium comprising program instructions for estimating a shift between two signals, wherein the program instructions are executable to implement:

(a) receiving a signal g, wherein the signal g corresponds to a shifted version of a signal f, wherein the signal g comprises a sequence of values having N components;

(b) creating a representation of the signal g in a space with dimension K less than N, wherein said creating produces a signal X having K components;

(c) computing measures of distance between the signal X and a set of stored signals, wherein each of the stored signals comprises a representation of a shifted version of the signal f in the space with dimension K (d) determining a first stored signal in the set of stored signals with a minimum distance to the signal X, wherein the first stored signal corresponds to a first shift value;

(e) providing the first shift value, wherein the first shift value is an estimate of a shift between the first signal g and the second signal f.

52. The memory medium of claim 51,
wherein the signal g comprises a shifted version of the signal f.

53. The memory medium of claim 51,
wherein the signal g comprises a shifted noise-perturbed version of the signal f.

54. The memory medium of claim 51,
wherein each of the stored signals is a representation of a shifted noise perturbed version of the signal f in a space with dimension K.

* * * * *